United States Patent
Hashimoto et al.

(10) Patent No.: US 10,167,056 B2
(45) Date of Patent: Jan. 1, 2019

(54) BICYCLE TRANSMISSION CONTROL APPARATUS

(71) Applicant: Shimano Inc., Sakai, Osaka (JP)

(72) Inventors: Akinori Hashimoto, Osaka (JP); Masako Itsukashi, Osaka (JP)

(73) Assignee: Shimano Inc., Osaka (JP)

( * ) Notice: Subject to any disclaimer, the term of this patent is extended or adjusted under 35 U.S.C. 154(b) by 329 days.

(21) Appl. No.: 15/183,498

(22) Filed: Jun. 15, 2016

(65) Prior Publication Data

US 2016/0375958 A1 Dec. 29, 2016

(30) Foreign Application Priority Data

Jun. 25, 2015 (JP) ................................. 2015-127964

(51) Int. Cl.
*F16H 61/02* (2006.01)
*B62M 9/122* (2010.01)
*B62M 1/36* (2013.01)

(52) U.S. Cl.
CPC .............. *B62M 9/122* (2013.01); *B62M 1/36* (2013.01); *F16H 61/0213* (2013.01)

(58) Field of Classification Search
None
See application file for complete search history.

(56) References Cited

U.S. PATENT DOCUMENTS

| | | | |
|---|---|---|---|
| 5,254,044 A * | 10/1993 | Anderson | B62M 9/122 474/103 |
| 5,261,858 A | 11/1993 | Browning | |
| 5,266,065 A * | 11/1993 | Ancarani Restelli | B62J 99/00 474/78 |
| 6,047,230 A | 4/2000 | Spencer et al. | |
| 2014/0088806 A1* | 3/2014 | Lee | B62M 25/08 701/22 |
| 2015/0032340 A1* | 1/2015 | Lee | F16H 61/0204 701/52 |
| 2016/0375957 A1* | 12/2016 | Hashimoto | B62M 9/122 474/70 |

FOREIGN PATENT DOCUMENTS

| | | |
|---|---|---|
| CN | 102745299 A | 10/2012 |
| JP | H07251786 A | 10/1995 |
| JP | H08113181 A | 5/1996 |
| JP | H10511621 A | 11/1998 |
| JP | 2000108982 A | 4/2000 |
| JP | 2001039380 A | 2/2001 |
| JP | 2001280464 A | 10/2001 |
| JP | 3413886 B2 | 6/2003 |
| JP | 4145839 B2 | 9/2008 |
| WO | 2012068265 A1 | 5/2012 |

* cited by examiner

*Primary Examiner* — Justin Holmes
(74) *Attorney, Agent, or Firm* — Global IP Counselors, LLP

(57) ABSTRACT

A bicycle transmission control apparatus is provided that can perform a shift control according to the traveling environment of the bicycle. The bicycle transmission control apparatus includes a controller that operates a transmission according to a parameter that represents a traveling state of a bicycle and predetermined shifting conditions. The controller sets the predetermined shifting condition based on the parameter representing a running state of the bicycle and on a tilt angle of the bicycle.

34 Claims, 11 Drawing Sheets

BICYCLE TRANSMISSION CONTROL APPARATUS

CROSS-REFERENCE TO RELATED APPLICATIONS

This application claims priority to Japanese Patent Application No. 2015-127964, filed on Jun. 25, 2015. The entire disclosure of Japanese Patent Application No. 2015-127964 is hereby incorporated herein by reference.

BACKGROUND

Field of the Invention

The present invention relates to a bicycle transmission control apparatus.

Background Information

Conventionally, a bicycle transmission control apparatus is known that controls the transmission. One example, a bicycle transmission control apparatus is disclosed in Japanese Unexamined Patent Publication No. 10-511621 that controls a transmission based on a rotational frequency of a crank so that the rotational frequency of the crank is maintained in a predetermined range.

SUMMARY

It has been found that an appropriate method of controlling the transmission is different depending on the traveling environment of the bicycle. For example, the control of the transmission is different between uphill traveling and traveling other than uphill. However, the tilt angle is not giving consideration to when controlling the transmission in Japanese Unexamined Patent Publication No. 10-511621.

An object of the present invention is to provide a bicycle transmission control apparatus that can perform a shift control according to the traveling environment of the bicycle.

The bicycle transmission control apparatus according to one embodiment of the present invention comprises a controller configured to a transmission according to a parameter that represents a traveling state of a bicycle and predetermined shifting conditions, wherein the controller is configured to set the predetermined shifting condition based on the parameter representing a running state of the bicycle and a tilt angle of the bicycle.

According to one example of the bicycle transmission control apparatus, the predetermined shifting condition comprises a threshold value regarding the parameter representing the running state of the bicycle, and the controller is configured to set the predetermined shifting condition by changing the threshold value.

According to one example of the bicycle transmission control apparatus, the threshold value includes a first threshold value, and a second threshold value that is less than the first threshold value, and the controller is configured to operate the transmission when a value of a parameter representing the running state of the bicycle changes from a value that is less than the first threshold value to a value that is greater than or equal to the first threshold value, or, when the value of the parameter representing the running state of the bicycle changes from a value exceeding the second threshold value to a value that it less than or equal to the second threshold value.

According to one example of the bicycle transmission control apparatus, the controller is configured to control the transmission so that the gear ratio of the bicycle is increased when the value of the parameter representing the running state of the bicycle changes from a value that is less than the first threshold value to a value that is greater than or equal to the first threshold value, and control the transmission so that the gear ratio of the bicycle is decreased when the value of the parameter representing the running state of the bicycle changes from a value exceeding the second threshold value to a value that is less than or equal to the second threshold value.

According to one example of the bicycle transmission control apparatus, the predetermined shifting conditions include a first shifting condition, and the controller is configured to operate the transmission based on the parameter that represents the running state of the bicycle and the first shifting condition when the tilt angle is greater than or equal to a first predetermined angle that exceeds zero degrees.

According to one example of the bicycle transmission control apparatus, the controller is further configured to set the first shifting condition by changing at least the second threshold value, based on the tilt angle being greater than or equal to the first predetermined angle, and on a fact that the tilt angle has changed.

According to one example of the bicycle transmission control apparatus, the controller is configured to set the first shifting condition by increasing at least the second threshold value, based on the rate of change being greater than or equal to a first ratio when the tilt angle has changed in an increasing direction, or, the amount of change being greater than or equal to a first change amount when the tilt angle has changed in an increasing direction.

According to one example of the bicycle transmission control apparatus, the controller is configured to set the first shifting condition by decreasing at least the second threshold value, based on the rate of change being greater than or equal to a second ratio when the tilt angle has changed in a decreasing direction, or, the amount of change being greater than or equal to a second change amount when the tilt angle has changed in a decreasing direction.

According to one example of the bicycle transmission control apparatus, the controller is configured to set the first shifting condition when the tilt angle is greater than or equal to the first predetermined angle, based on the increased travel distance of the bicycle being greater than or equal to a first travel distance, or, the elapsed travel time of the bicycle being greater than or equal to a first travel time.

According to one example of the bicycle transmission control apparatus, the controller is configured to set the first shifting condition, based on a parameter representing the running state of the bicycle when the tilt angle changes from a value that is less than the first predetermined angle to a value that is greater than or equal to the first predetermined angle.

According to one example of the bicycle transmission control apparatus, the first threshold value in the first shifting condition is greater than the value of the parameter representing the running state of the bicycle of when the tilt angle changes from a value that is less than the first predetermined angle to a value that is greater than or equal to the first predetermined angle, and the second threshold value in the first shifting condition is greater than the value of the parameter representing the running state of the bicycle of when the tilt angle changes from a value that is less than the first predetermined angle to a value that is greater than or equal to the first predetermined angle.

According to one example of the bicycle transmission control apparatus, the difference between the value of the parameter representing the running state of the bicycle of when the tilt angle changes from a value that is less than the first predetermined angle to a value that is greater than or equal to the first predetermined angle, and the second threshold value in the first shifting condition, is smaller than the difference between the value of the parameter representing the running state of the bicycle of when the tilt angle changes from a value that is less than the first predetermined angle to a value that is greater than or equal to the first predetermined angle, and the first threshold value in the first shifting condition.

According to one example of the bicycle transmission control apparatus, the predetermined shifting conditions include a second shifting condition, and the controller is configured to operate the transmission based on the parameter that represents the running state of the bicycle and the second shifting condition when the tilt angle exceeds 0 degrees and is less than the first predetermined angle.

According to one example of the bicycle transmission control apparatus, the predetermined shifting conditions include a third shifting condition, and the controller is configured to operate the transmission based on the parameter that represents the running state of the bicycle and the third shifting condition when the tilt angle is less than or equal to a second predetermined angle that is less than zero degrees.

According to one example of the bicycle transmission control apparatus, the controller is configured to set the third shifting condition by changing at least the first threshold value, based on the tilt angle being less than or equal to the second predetermined angle, and on the fact that the tilt angle has changed.

According to one example of the bicycle transmission control apparatus, the controller is configured to set the third shifting condition by decreasing at least the first threshold value, based on the rate of change being greater than or equal to a third ratio when the tilt angle has changed in a decreasing direction, or, the amount of change being greater than or equal to a third change amount when the tilt angle has changed in a decreasing direction.

According to one example of the bicycle transmission control apparatus, the controller is configured to set the third shifting condition by increasing at least the first threshold value, based on the rate of change being greater than or equal to a fourth ratio when the tilt angle has changed in an increasing direction, or, the amount of change being greater than or equal to a fourth change amount when the tilt angle has changed in an increasing direction.

According to one example of the bicycle transmission control apparatus, the controller is configured to set the third shifting condition when the tilt angle is less than or equal to the second predetermined angle, based on the increased travel distance of the bicycle being greater than or equal to a second travel distance, or, the elapsed travel time of the bicycle being greater than or equal to a second travel time.

According to one example of the bicycle transmission control apparatus, the controller is configured to set the third shifting condition, based on a parameter representing the running state of the bicycle when the tilt angle changes from a value that exceeds the second predetermined angle to a value that is less than or equal to the second predetermined angle.

According to one example of the bicycle transmission control apparatus, the first threshold value in the third shifting condition is smaller than the value of the parameter representing the running state of the bicycle of when the tilt angle changes from a value that exceeds the second predetermined angle to a value that is less than or equal to the second predetermined angle, and the second threshold value in the third shifting condition is smaller than the value of the parameter representing the running state of the bicycle of when the tilt angle changes from a value that exceeds the second predetermined angle to a value that is less than or equal to the second predetermined angle.

According to one example of the bicycle transmission control apparatus, a difference between the value of the parameter representing the running state of the bicycle of when the tilt angle changes from a value that exceeds the second predetermined angle to a value that is less than or equal to the second predetermined angle, and the second threshold value in the third shifting condition, is larger than the difference between the value of the parameter representing the running state of the bicycle of when the tilt angle changes from a value that exceeds the second predetermined angle to a value that is less than or equal to the second predetermined angle, and the first threshold value in the third shifting condition.

According to one example of the bicycle transmission control apparatus, the predetermined shifting conditions include a fourth shifting condition, and the controller is configured to operate the transmission based on the parameter that represents the running state of the bicycle and the fourth shifting condition when the tilt angle is less than 0 degrees and exceeds the second predetermined angle.

According to one example of the bicycle transmission control apparatus, the predetermined shifting conditions include a fifth shifting condition, and the controller is configured to operate the transmission based on the parameter that represents the running state of the bicycle and the fifth shifting condition until the value of the parameter representing the running state of the bicycle reaches a predetermined value, when starting from a state in which the bicycle is stopped.

According to one example of the bicycle transmission control apparatus, the threshold value in the fifth shifting condition includes a third threshold value and a fourth threshold value, the third threshold value corresponds to a first gear ratio, and the fourth gear ratio is larger than the third threshold value, and corresponds to a second gear ratio that is larger than the first gear ratio.

According to one example of the bicycle transmission control apparatus, the predetermined shifting conditions include a sixth shifting condition, and the controller is configured to operate the transmission when a signal for increasing the gear ratio of the bicycle is inputted from the operating unit, set the sixth shifting condition based on the parameter representing the running state of the bicycle of immediately after the transmission is operated, and operate the transmission based on the parameter representing the running state of the bicycle and the sixth shifting condition.

According to one example of the bicycle transmission control apparatus, the predetermined shifting conditions include a seventh shifting condition, and the controller is configured to operate the transmission when a signal for decreasing the gear ratio of the bicycle is inputted from the operating unit, set the seventh shifting condition based on the parameter representing the running state of the bicycle of prior to operating the transmission, and operate the transmission based on the parameter representing the running state of the bicycle and the seventh shifting condition.

According to one example of the bicycle transmission control apparatus, the controller is configured to prohibit a control of the transmission according to the parameter representing the running state of the bicycle and the predetermined shifting condition until a predetermined period has elapsed after an acceleration that is generated in the bicycle exceeds a predetermined acceleration.

According to one example of the bicycle transmission control apparatus, the predetermined period is set based on the magnitude of the acceleration.

According to one example of the bicycle transmission control apparatus, the parameter representing the running state of the bicycle is at least one from among a rotational frequency a bicycle crank of the bicycle and a traveling speed of the bicycle.

According to one example of the bicycle transmission control apparatus, the controller is configured to calculate the rotational frequency of the crank based on an output of a sensor that detects the rotational frequency of the bicycle crank.

According to one example of the bicycle transmission control apparatus, the controller is configured to calculate the rotational frequency of the crank based on an output of a sensor that detects the vehicle speed of the bicycle.

According to one example of the bicycle transmission control apparatus, the controller is configured to calculate the tilt angle based on an output of a tilt sensor that detects the tilt angle of the bicycle.

According to one example of the bicycle transmission control apparatus, the tilt angle of the bicycle is a tilt angle in the longitudinal direction of the bicycle.

According to one example of the bicycle transmission control apparatus, the tilt angle of the bicycle is a pitch angle of the bicycle.

The bicycle control apparatus of the present invention is able to perform a shift control according to the traveling environment of the bicycle.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
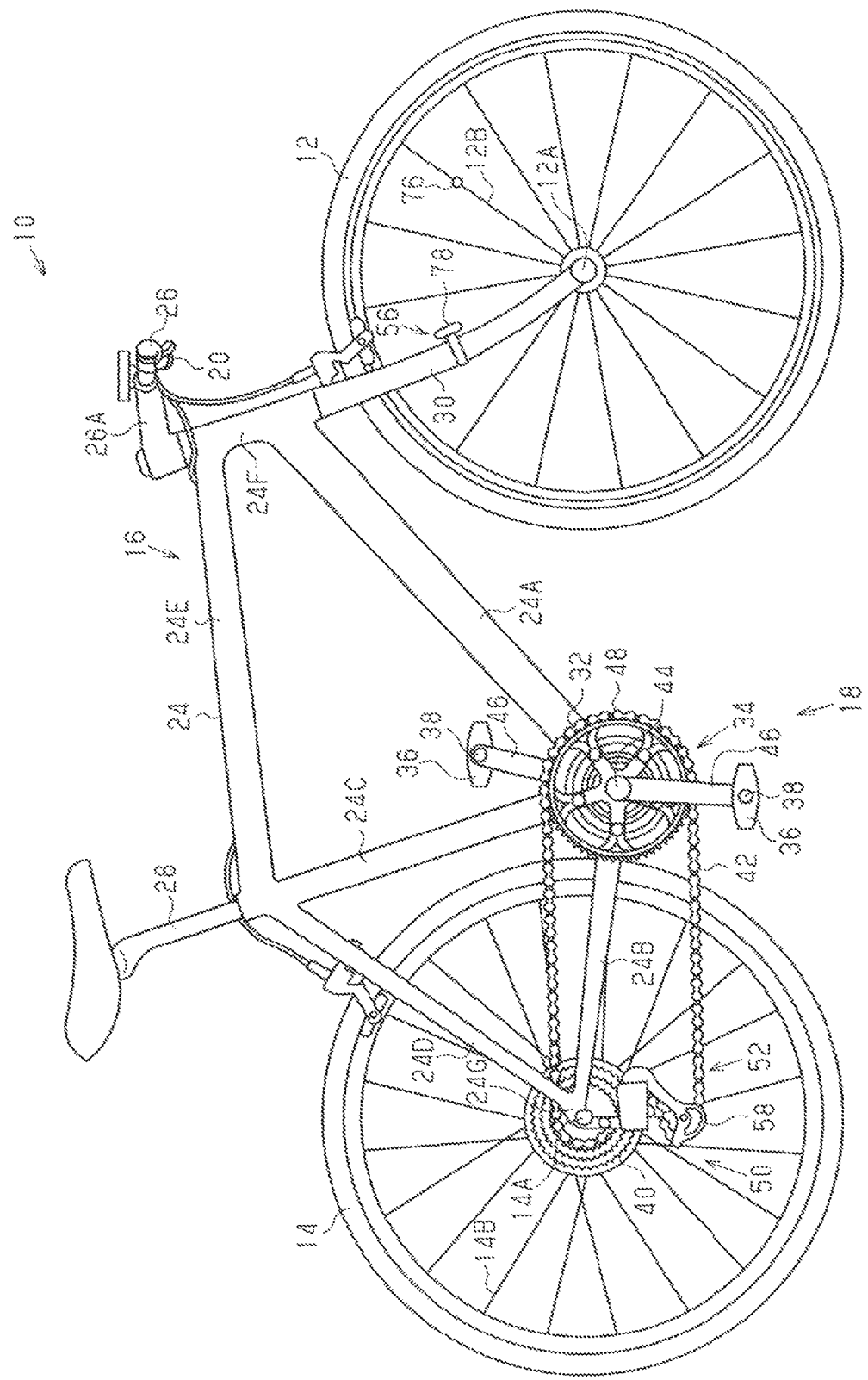
FIG. 1 is a side elevational view of a bicycle equipped with a bicycle control apparatus in accordance with a first embodiment.

Referring initially to FIG. 1, a bicycle 10 is illustrated that is equipped with a bicycle transmission control apparatus in accordance with selected illustrated embodiments. The bicycle 10 comprises a front wheel 12, a rear wheel 14, a vehicle body 16, a drive mechanism 18, an operating unit 20 and a transmission control apparatus 50.

The vehicle body 16 comprises a frame 24, a handlebar 26, a seat post 28 and a front fork 30. The handlebar 26 is connected to the frame 24. The seat post 28 is connected to the frame 24. The front fork 30 is connected to the frame 24.

The frame 24 comprises a bottom bracket 32 for supporting a crankshaft 44 of the drive mechanism 18. The frame 24 comprises a down tube 24A, a chain stay 24B and a seat tube 24C. The down tube 24A extends forward from the bottom bracket 32. The chain stay that extends rearward from the bottom bracket 32. The seat tube 24C that extends upward from the bottom bracket 32. Further, the frame 24 comprises a seat stay 24D, a top tube 24E and a head tube 24F. The seat stay 24D connects the rear end of the chain stay 24B and the upper end of the seat tube 24C. The top tube 24E extends forward from the upper end of the seat tube 24C. The head tube 24F connects the front end of the down tube 24A and the front end of the top tube 24E. A derailleur hanger 24G is disposed on the rear end of the chain stay 24B.

The handlebar 26 is detachably connected to the front fork 30 via a stem 26A. The seat post 28 is detachably connected to the seat tube 24C. The front fork 30 is supported to the head tube 24F and connected to an axle 12A of the front wheel 12.

The drive mechanism 18 comprises a crank assembly 34, a pair of (left and right) pedals 36, a pair of (left and right) pedal shafts 38, a plurality of rear sprockets 40 and a chain 42.

The crank assembly 34 comprises a crankshaft 44, a pair of (left and right) crank arms 46 and a front sprocket 48. The crankshaft 44 is rotatably supported to the bottom bracket 32. The front sprocket 48 is connected to the crankshaft 44. The left and right crank arms 46 are attached to the crankshaft 44. The left and right pedals 36 are attached to the crank arms 46 so as to be rotatable around the pedal shafts 38.

The front sprocket 48 is coupled to the crankshaft 44 or the crank arms 46. The front sprocket 48 is provided coaxially with the crankshaft 44. The front sprocket 48 is coupled so as not to rotate relative to the crankshaft 44.

The rear sprockets 40 are rotatably attached to the rear wheel 14 around an axle 14A of the rear wheel 14. The rear sprockets 40 are coupled to the rear wheel 14 via a one-way clutch. The chain 42 is wound to the front sprocket 48 and one of the rear sprockets 40. When the crank shaft 44 is rotated by the manual drive force that is applied to the pedal 36, the rear wheel 14 is rotated by the front sprocket 48, the chain 42, and one of the rear sprockets 40.

The operating unit 20 is attached to the handlebar 26. The operating unit 20 is electrically connected to a controller 54 (refer to FIG. 3) of the transmission control apparatus 50 by an unillustrated cable. When the operating unit 20 is operated by an operator, the operating unit 20 transmits a upshift signal or a downshift signal to the controller 54 (refer to FIG. 3). Upshift is a shift in the direction that the gear ratio γ increases, and downshift is a shift in the direction that the gear ratio γ decreases. It is also possible to connect the operating unit 20 and the controller 54 (refer to FIG. 3) so as to communicate via wireless communications.

Figure 3:
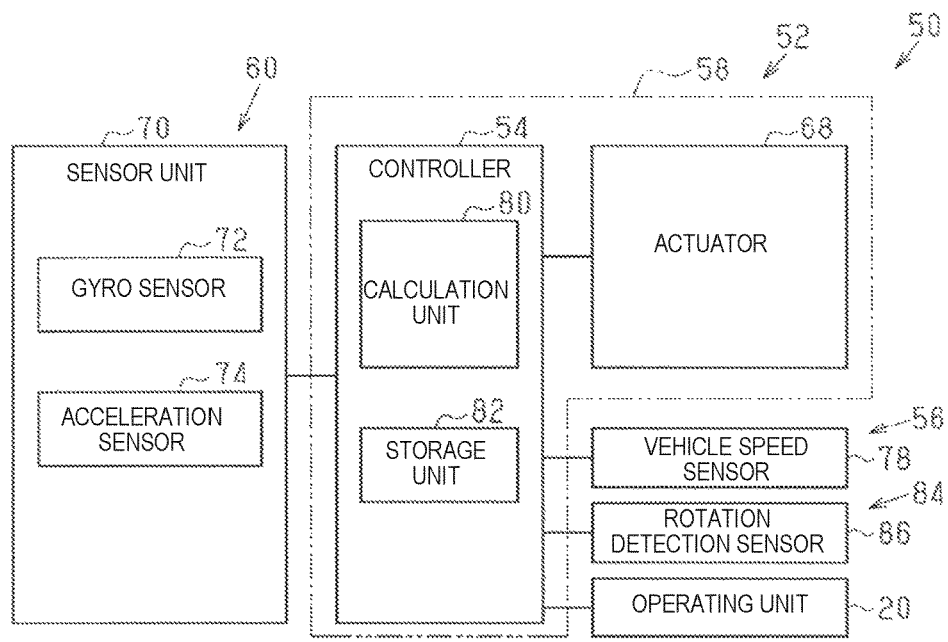
FIG. 3 is a block diagram of the transmission control apparatus for the bicycle transmission that is mounted on the bicycle illustrated in FIG. 1.

The transmission control apparatus 50 comprises a controller 54 (refer to FIG. 3). The transmission control apparatus 50 preferably comprises a transmission device 52 and a vehicle speed detection device 56. As shown in FIG. 3, the transmission device 52 comprises a transmission 58 and a tilt sensor 60. The transmission 58 is configured to change the gear ratio γ of the bicycle 10. The tilt sensor 60 is disposed on the vehicle body 16. The tilt sensor 60 is configured output a signal that reflects the inclination of the bicycle 10 with respect to horizontal (i.e., level ground).

Figure 2:
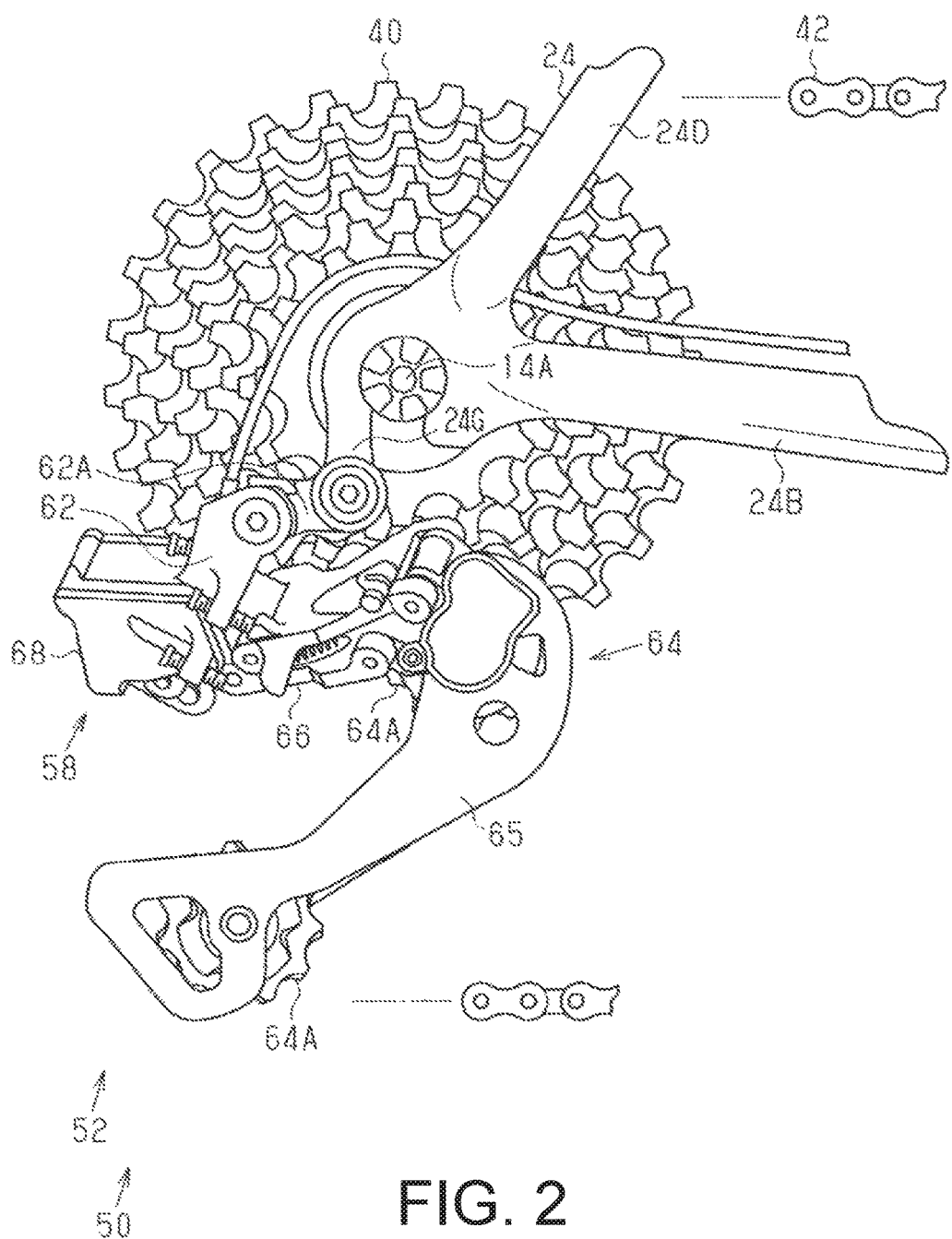
FIG. 2 is aside devotional view of a rear portion of the bicycle illustrated in FIG. 1 that includes a bicycle transmission that is mounted on the bicycle.

As shown in FIG. 2, the transmission 58 is a bicycle rear derailleur. The transmission 58 moves the chain between the rear sprockets 40 which are able to establish different gear ratios γ. The gear shift stages of the transmission 58 correspond to each of the rear sprockets 40. The transmission 58 is attached to the derailleur hanger 24G of the frame 24 in the vicinity of the axle of the rear wheel 14. The transmission 58 comprises a base member 62, a movable member 64, a coupling member 66 and an actuator 68. The base member 62 is attached to the frame 24 of the bicycle 10. The movable member 64 is movable with respect to the base member 62. The coupling member 66 couples the base member 62 and the movable member 64. The actuator 68 is operatively coupled to the coupling member 66 to move the movable member 64 with respect to the base member 62. The actuator 68 is, for example, an electric motor. The actuator 68, the controller 54, and the tilt sensor 60 are electrically connected to an unillustrated battery, and are supplied power from the battery. The battery can be disposed on the transmission 58. Alternatively, for example, the battery can be provided outside the transmission 58, such as the frame 24.

The base member 62 is attached to the frame 24 via a bracket 62A and a bolt or the like. The bracket 62A is fixed to the derailleur hanger 24G. The coupling member 66 connects the base member 62 and the movable member 64 so that the movable member 64 is movable with respect to the base member 62. The movable member 64 supports a chain guide 65. The chain guide 65 comprises a pair of pulleys 64A. The chain 42 is wound to the pulleys 64A.

The actuator 68 changes the gear ratio γ by operating the transmission 58. Specifically, the actuator 68 moves the coupling member 66 and the movable member 64 with respect to the base member 62. The transmission 58 switches the chain 42 between the rear sprockets 40 by driving of the actuator 68 to change the gear ratio γ.

As shown in FIG. 3, the tilt sensor 60 comprises a sensor unit 70. The tilt sensor 60 is disposed on the frame 24 (refer to FIG. 1). The tilt sensor 60 can be provided inside the frame 24 (refer to FIG. 1), or attached on the outer surface of the frame 24 (refer to FIG. 1). The tilt sensor 60 is electrically connected to the controller 54 by an electrical cable.

The sensor unit 70 comprises a three-axis gyro sensor 72 and a three-axis acceleration sensor 74. Thus, the tilt sensor 60 comprises the gyro sensor 72 and the acceleration sensor 74. The output of the tilt sensor 60 includes the inclination angle of each of the three axes and the acceleration information of each of the three axes. The inclination angles of the three axes are a pitch angle θA, a roll angle θB, and a yaw angle θC. The three axes of the gyro sensor 72 preferably match with the three axes of the acceleration sensor 74. The sensor unit 70 is preferably attached to the frame 24 so that the lateral direction of the vehicle body 16 (refer to FIG. 1) and the direction in which the axis of the pitch angle θA extends are substantially coincident.

The vehicle speed detection device 56 shown in FIG. 1 detects the rotation of the front wheel 12. The vehicle speed detection device 56 comprises a magnet 76 and a vehicle speed sensor 78. The magnet 76 is attached to the spokes 12B of the front wheel 12. The vehicle speed sensor 78 is attached to the front fork 30. The magnet 76 can be attached to the spokes 14B of the rear wheel 14 as well. In this case the vehicle speed detection device 56 is attached to the chain stay 24B. The vehicle speed detection device 56 is fixed to the vehicle body 16 by bolts and nuts, a band, or the like. In the description below, the vehicle speed detection device 56 is configured to detect the rotation of the front wheel 12, but a case in which the vehicle speed detection device 56 detects the rotation of the rear wheel 14 only replaces the front wheel 12 with the rear wheel 14, so the description thereof will be omitted.

The vehicle speed sensor 78 is electrically connected to the controller 54 (refer to FIG. 3) by an unillustrated cable. The vehicle speed sensor 78 comprises an element (not shown) that outputs a value corresponding to changes in the relative position with the magnet 76. The element is realized by a magnetic reed that configures a reed switch, a Hall Effect element, or the like. The vehicle speed sensor 78 outputs the output of the element (not shown) to the controller 54 shown in FIG. 3. The controller 54 calculates the travel distance per unit of time (hereinafter referred to as "vehicle speed V") based on the circumferential length of the front wheel 12 (refer to FIG. 1), which is stored in advance. That is, the vehicle speed sensor 78 outputs a signal that reflects the vehicle speed V of the bicycle 10.

The transmission control system 50 further comprises a crank rotation detection device 84. The crank rotation detection device 84 comprises a crank arm 46 shown in FIG. 1, a magnet (not shown) attached to the front sprocket 48 or the crankshaft 44, and a rotation detection sensor 86 (refer to FIG. 3) that is attached to the frame 24. The rotation detection sensor 86 shown in FIG. 3 is electrically connected to the controller 54 by a cable. The rotation detection sensor 86 comprises an element (not shown) that outputs a value corresponding to changes in the relative position with the crank arm 46. The element is realized by a magnetic reed that configures arced switch, a Hall Effect element, or the like.

The controller 54 shown in FIG. 3 is disposed on the transmission 58. The controller 54 is preferably disposed on the base member 62 (refer to FIG. 2). The controller 54 can be provided inside the base member 62 (refer to FIG. 2), or attached on the outer surface of the base member 62 (refer to FIG. 2). The controller 54 comprises a calculation unit 80 for performing various calculations and a storage unit 82. The controller 54 also preferably includes other conventional components such as an input interface circuit, an output interface circuit. The controller 54 is preferably a microcomputer in which the calculation unit 80 includes none or more processors. The storage unit 82 is preferably any memory device (i.e., a non-transitory computer readable medium such as a ROM (Read Only Memory) device and a RAM (Random Access Memory) device, hard disk, etc.). The storage unit 82 is configured to store programming, data, calculations and/or results. In the illustrated embodiment, the storage unit 82 has an automatic shifting program prestored therein for shifting the transmission 58.

The controller 54 is configured (programmed) to calculate the rotational frequency of the crankshaft 44 per unit of time (hereinafter referred to as "crank rotational frequency N") based on the output of the rotation detection sensor 86. The crank rotational frequency N is a parameter representing the running state of the bicycle 10. Meanwhile, the controller 54 can be configured to calculate the crank rotational frequency N based on the output of the vehicle speed sensor 78. In this case, the controller 54 can calculate the crank rotational frequency N from the vehicle speed V and the gear ratio γ. If a stage number detection sensor is provided to the transmission 58 for detecting the gear shift stage and the gear ratio γ corresponding to the gear shift stage is stored in the storage unit 82 of the controller 54, then the controller 54 can calculate the crank rotational frequency N from the detection result of the stage number detection sensor. Further, the controller 54 can calculate the crank rotational frequency N based on the output of the vehicle speed sensor 78 and can calculate the crank rotational frequency N based on the output of the rotation detection sensor 86. Especially, when coasting, the vehicle speed V is greater than "0" but the crank rotational frequency N detected by the rotation detection sensor 86 will be "0" so it is preferable to calculate the crank rotational frequency N based on the vehicle speed V. Therefore, the controller 54 can use the crank rotational frequency N calculated based on the vehicle speed V only when the actual crank rotational frequency N that is detected by the rotation detection sensor 86 is less than the crank rotational frequency N that is calculated based on the vehicle speed V.

The controller 54 is configured (programmed) to calculate the tilt angle θ of the bicycle 10 based on the outputs of the tilt sensor 60 and the vehicle speed sensor 78. The tilt angle θ is a tilt angle of the bicycle 10 in the longitudinal direction, around an axis that extends in the lateral direction of the vehicle body 16 (refer to FIG. 1). That is, the tilt angle θ is the pitch angle θA of the bicycle 10. The tilt angle θ is set to be "0 degrees" when the vehicle body 16 is placed in a flat location (i.e., a level horizontal surface). Accordingly, the tilt angle θ correlates with the gradient of the traveling road surface of the bicycle 10.

Figure 4:
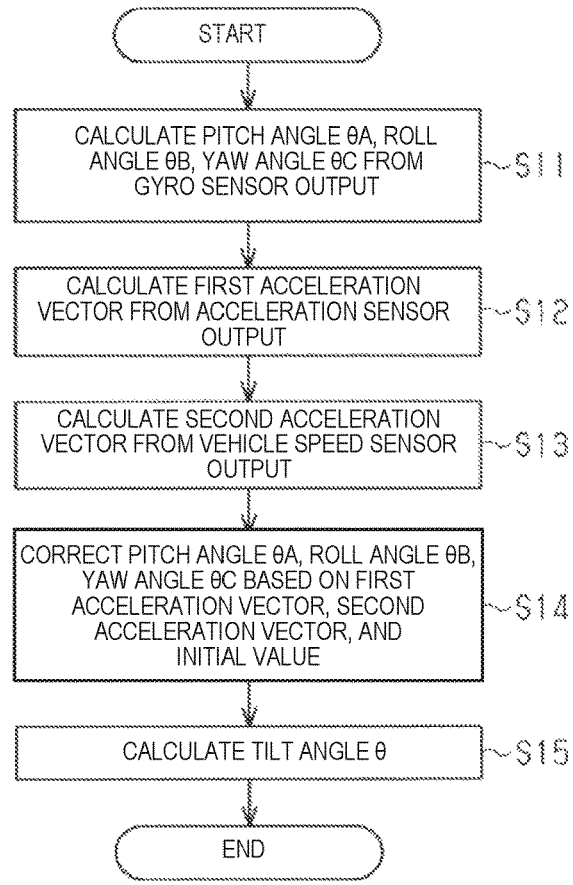
FIG. 4 is a flowchart of the calculation process of the tilt angle executed by the controller of FIG. 3.
Figure 5:
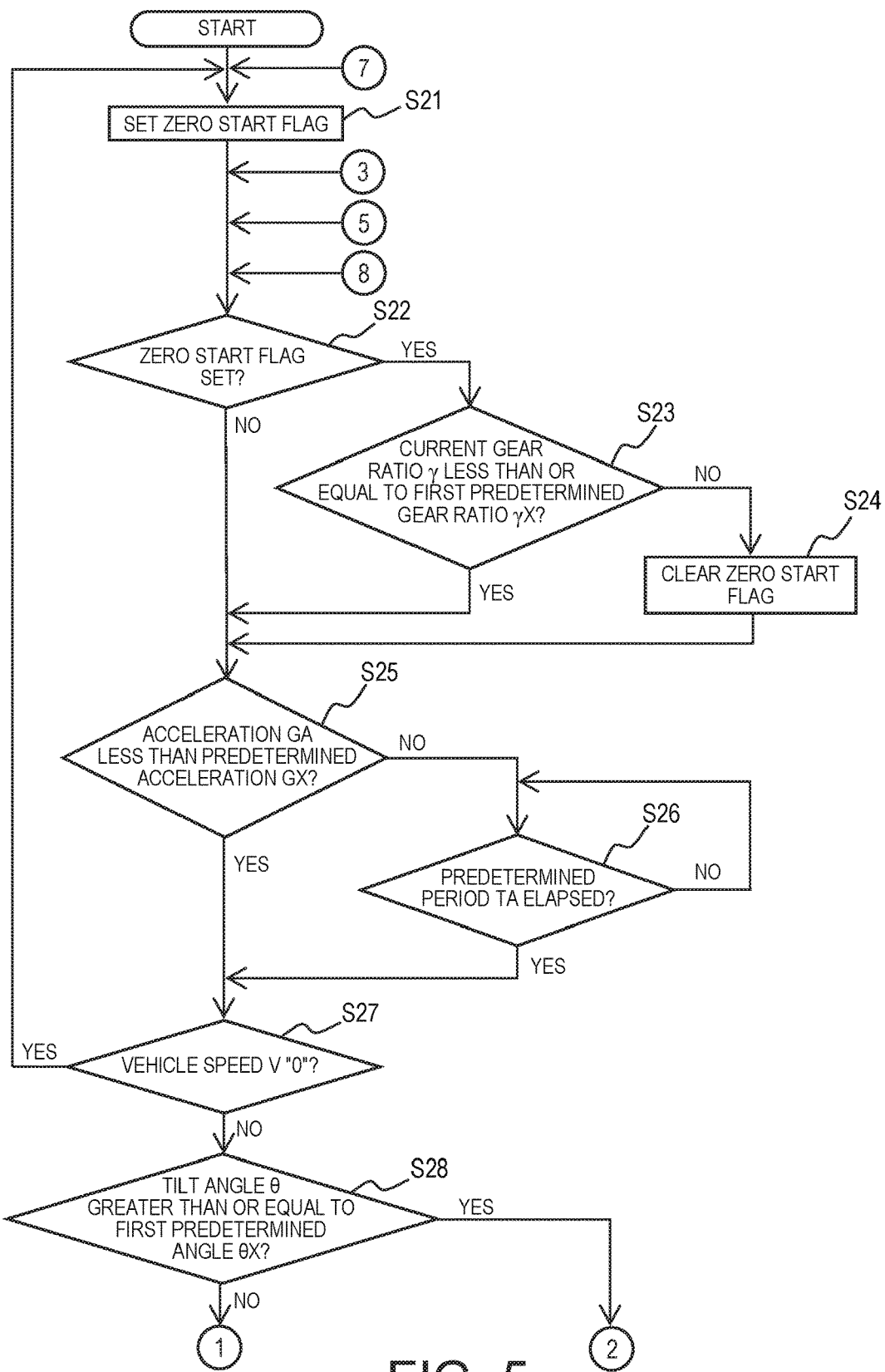
FIG. 5 is a flowchart of a first set of steps of the shifting process executed by the controller of FIG. 3.

The calculation steps of the tilt angle θ will be described with reference to FIG. 4. The controller 54 calculates the pitch angle θA, the roll angle θB, and the yaw angle θC from the output of the gyro sensor 72, in step S11. The controller 54 calculates a first acceleration vector in the longitudinal direction of the vehicle body 16 (refer to FIG. 1) from the acceleration sensor 74, in step S12. The controller 54 calculates a second acceleration vector from the output of the vehicle speed sensor 78, in step S13.

The controller 54 is configured (programmed) to correct the pitch angle θA, the roll angle θB, and the yaw angle θC based on the first acceleration vector and the second acceleration vector, to reduce errors included in the pitch angle θA, the roll angle θB, and the yaw angle θC, in step S14. Specifically, the controller 54 calculates the correction angle for each of the pitch angle θA, the roll angle θB, and the yaw angle θC, based on the difference between the first acceleration vector and the second acceleration vector. The controller 54 adds the correction angle to the pitch angle θA, the roll angle θB, and the yaw angle θC.

The controller 54 calculates the tilt angle θ based on the pitch angle θA, the roll angle θB, and the yaw angle θC that are corrected in step S14 and the initial value of the tilt angle of the bicycle 10, in step S15. The tilt angle θ can be calculated based on the pitch angle θA, the roll angle θB, and the initial value of the tilt angle of the bicycle 10, when the sensor unit 70 is attached to the transmission 58, so that the lateral direction of the vehicle body 16 (refer to FIG. 1) and the direction in which the axis of the pitch angle θA extends are substantially coincident. Further, the tilt angle θ can be calculated based on the pitch angle θA and the initial value of the tilt angle of the bicycle 10, when the sensor unit 70 is attached to the transmission 58, so that the lateral direction of the vehicle body 16 (refer to FIG. 1) and the direction in which the axis of the pitch angle θA extends are substantially coincident, and the longitudinal direction of the vehicle body 16 (refer to FIG. 1) and the direction in which the axis of the roll angle θB extends are substantially coincident.

The controller 54 causes the transmission 58 to be operated according to the crank rotational frequency N and a predetermined shifting condition. The controller 54 sets the predetermined shifting condition based on the crank rotational frequency N and the tilt angle θ.

The predetermined shifting conditions include a first shifting condition, a second shifting condition, a fifth shifting condition, a sixth shifting condition, and a seventh shifting condition. The predetermined shifting conditions include a threshold value related to the crank rotational frequency N. The controller 54 causes the transmission 58 to be operated according to a comparison result between the crank rotational frequency N and the threshold value. The controller 54 sets the predetermined shifting condition by changing the threshold value. The threshold value includes a first threshold value NX and a second threshold value NY.

The controller 54 sets a first shifting condition by changing the first threshold value NX and the second threshold value NY based on the crank rotational frequency N of when the tilt angle θ changes from a value that is less than a first predetermined angle θX to a value that is greater than or equal to the first predetermined angle θX. The controller 54 causes the transmission 58 to be operated based on the crank rotational frequency N and the first shifting condition when the tilt angle θ is greater than or equal to the first predetermined angle θX. Specifically, the controller 54 causes the transmission 58 to be operated based on a comparison result of the first threshold value NX and the second threshold value NY which are included in the first shifting condition and the crank rotational frequency N, when the tilt angle θ is greater than or equal to the first predetermined angle θX.

The controller 54 sets a second shifting condition by changing the first threshold value NX and the second threshold value NY to the first threshold value NX and the second threshold value NY for traveling, when the tilt angle θ exceeds 0 degrees and is less than the first predetermined angle θX. The controller 54 causes the transmission 58 to be operated based on the second shifting condition when the tilt angle θ exceeds 0 degrees and is less than the first predetermined angle θX. Specifically, the controller 54 causes the transmission 58 to be operated based on a comparison result of the first threshold value NX and the second threshold value NY which are included in the second shifting condition and the crank rotational frequency N, when the tilt angle θ exceeds 0 degrees and is less than the first predetermined angle θX. The first threshold value NX and the second threshold value NY for traveling are changed based on a upshift signal and a downshift signal. The storage unit 82 stores the base value of the first threshold value NX and the base value of the second threshold value NY for traveling. The base value of the first threshold value NX for traveling is, for example, 75 rpm. The base value of the second threshold value NY for traveling is, for example, 60 rpm. The difference between the first threshold value NX and the second threshold value NY for traveling is preferably 15-20 rpm.

When the bicycle 10 starts to travel from a stopped state, the controller 54 sets the fifth shifting condition by changing the first threshold value NX and the second threshold value NY to the first threshold value NX and the second threshold value NY for starting.

When the bicycle 10 starts to travel from a stopped state, the controller 54 causes the transmission 58 to be operated based on the crank rotational frequency N and the fifth shifting condition until the gear ratio γ becomes greater than or equal to a predetermined gear ratio γX. Specifically, when the bicycle 10 starts to travel from a stopped state, the transmission 58 is caused to be operated based on a comparison result of the first threshold value NX and the second threshold value NY for starting which are included in the fifth shifting condition and the crank rotational frequency N.

The first threshold value NX for starting, that is, the first threshold value NX in the fifth shifting condition, includes an upper limit threshold NX1 which corresponds to a first gear ratio γA, and an upper limit threshold NX2 which corresponds to a second gear ratio γB which is a larger gear ratio γ than the first gear ratio γA. The second threshold value NY for starting, that is, the second threshold value NY in the fifth shifting condition, includes a lower limit threshold NY1 which corresponds to the first gear ratio γA, and a lower limit threshold NY2 which corresponds to the second gear ratio γB. The upper limit threshold NX1 and the lower limit threshold NY1 are the third threshold values in the fifth shifting condition. The upper limit threshold NX2 and the lower limit threshold NY2 are the fourth threshold values in the fifth shifting condition. That is, the threshold values in the fifth shifting condition include the third threshold values and the fourth threshold values.

The upper limit threshold NX1 is smaller than the upper limit threshold NX2, in a range from a gear ratio γ which corresponds to the minimum gear shift stage number to a gear ratio γ which corresponds to a first predetermined gear shift stage number. The lower limit threshold NY1 is smaller than the lower limit threshold NY2, in a range from a gear ratio γ which corresponds to the minimum gear shift stage number to a gear ratio γ which corresponds to a second predetermined gear shift stage number. The first predetermined gear shift stage number is, for example, the fourth stage. The second predetermined gear shift stage number is, for example, the fifth stage.

The storage unit 82 stores a shift stage table showing the relationship between the gear shift stage number, and the first threshold value NX for starting as well as the second threshold value NY for starting. Table 1 shows one example of a shift stage table showing the relationship between the gear shift stage number, and the first threshold value NX for starting as well as the second threshold value NY for starting, in the transmission 58 when there are eight gear shift stages.

TABLE 1

| | | Threshold Value For Starting | |
|---|---|---|---|
| | | First Threshold Value NX | Second Threshold Value NY |
| Gear Shift Stage | 1 | 30 | 10 |
| | 2 | 40 | 15 |
| | 3 | 55 | 25 |
| | 4 | 75 | 35 |
| | 5 | 75 | 60 |
| | 6 | 75 | 60 |
| | 7 | 75 | 60 |
| | 8 | 75 | 60 |

When the tilt angle θ is greater than or equal to the first predetermined angle θX and a upshift signal for increasing the gear ratio γ is inputted from the operating unit 20, the controller 54 causes the transmission 58 to be operated, and sets a sixth shifting condition by changing the first threshold value NX and the second threshold value NY based on the crank rotational frequency N of immediately after causing the transmission 58 to be operated. The controller 54 causes the transmission 58 to be operated based on the crank rotational frequency N and the sixth shifting condition, when the sixth shifting condition is set.

When the tilt angle θ is greater than or equal to the first predetermined angle θX and a downshift signal for decreasing the gear ratio γ is inputted from the operating unit 20, the controller 54 causes the transmission 58 to be operated, and sets a seventh shifting condition by changing the first threshold value NX and the second threshold value NY based on the crank rotational frequency N of prior to causing the transmission 58 to be operated. The controller 54 causes the transmission 58 to be operated according to the crank rotational frequency N and the seventh shifting condition, when the seventh shifting condition is set.

The shifting process that is executed by the controller 54 are described with reference to FIGS. 5 to 9. The shifting process is started when a supply of power to the controller 54 is turned ON via an operation of an unillustrated operating button, or the like, and the shifting process is started from step S21 every time the power supply is tuned ON. The shifting process shown in FIGS. 5 to 9 can also be started when the mode is switched from a manual transmission mode to an automatic transmission mode by a changeover switch. When the automatic transmission mode is set, the controller 54 executes the steps of FIGS. 5 to 9. That is, the controller 54 can control the transmission 58 automatically. When the manual transmission mode is set, the controller 54 controls the transmission 58 based only on an operation signal from the operating unit 20. That is, in the manual transmission mode, the controller 54 controls the transmission 58 based only on an operation of the driver.

The shifting process includes a first set of steps, a second set of steps, a third set of steps, and a fourth set of steps. The first set of steps which are executed immediately after the power supply is turned ON will be described with reference to FIG. 5.

The controller 54 sets a zero start flag in step S21, and proceeds to step S22. When the zero start flag is set, the controller 54 performs a shift control using the first threshold value NX and the second threshold value NY for starting. On the other hand, when the zero start flag is not set, the controller 54 performs a shift control using the first threshold value NX and the second threshold value NY for traveling. The zero start flag is set when the power is turned on and when the vehicle speed V is "0." With the first threshold value NX and the second threshold value NY being set to the first threshold value NX and the second threshold value NY for traveling by the zero start flag being set, the fifth shifting condition is set.

The controller 54 determines whether or not the zero start flag is set in step S22. When the zero start flag is not set, the controller 54 proceeds to step S25. When the zero start flag is set in step S22, the controller 54 determines whether or not the current gear ratio γ is equal to or less than a predetermined gear ratio γX, in step S23. When the current gear ratio γ is greater than the predetermined gear ratio γX, the controller 54 clears the zero start flag in step S24, and proceeds to step S25. When the current gear ratio γ is less than or equal to the predetermined gear ratio γX, the controller 54 does not clear the zero start flag, and proceeds to step S25. For example, when the gear shift stage number of the transmission 58 is the eleventh stage, a gear ratio γ that corresponds with the fourth stage can be set as the predetermined gear ratio γX.

The controller 54 determines whether or not the acceleration GA is less than a predetermined acceleration GX in step S25. The acceleration G is preferably acceleration in the longitudinal direction of the bicycle 10, and is calculated based on an output of an acceleration sensor 74 or a vehicle speed sensor 78. When the acceleration GA is greater than or equal to the predetermined acceleration GX, the controller 54 does not proceed to the next step S27 but repeats the determination process of step S26 until a predetermined period TA has elapsed in step S26. The controller 54 proceeds to step S27 if the acceleration GA is less than the predetermined acceleration GX, or, after the predetermined period TA has elapsed after the acceleration GA is determined to be greater than or equal to the predetermined acceleration GX. That is, the controller 54 prohibits a control of the transmission 58 corresponding to the crank rotational frequency N and the predetermined shifting condition, until the predetermined period TA has elapsed after the acceleration GA that is generated in the bicycle 10 exceeds the predetermined acceleration GX. The predetermined period TA is set based on the magnitude of the acceleration GA. Specifically, the predetermined period TA is longer as the acceleration GA is increased. A table, a map, or a formula showing the relationship between the acceleration GA and the predetermined period TA is stored in the storage unit 82.

The controller 54 determines whether or not the vehicle speed V is "0" in step S27. When the vehicle speed V is "0," the controller 54 starts the steps from step S21 again. When the vehicle speed V is greater than "0," the controller 54 determines whether or not the tilt angle θ is greater than or equal to the first predetermined angle θX which exceeds 0 degrees, in step S28. The first predetermined angle θX is preferably selected to be an angle that corresponds to an uphill road gradient of 2%-10%. The first predetermined angle θX is, for example, 1.1 degrees, corresponding to an uphill road gradient of 2%. The controller 54 proceeds to step S29 (refer to FIG. 6) when the tilt angle θ is less than the first predetermined angle θX which exceeds 0 degrees, and proceeds to step S41 (refer to FIG. 8) when the tilt angle θ is greater than or equal to the first predetermined angle θX which exceeds 0 degrees.

Figure 6:
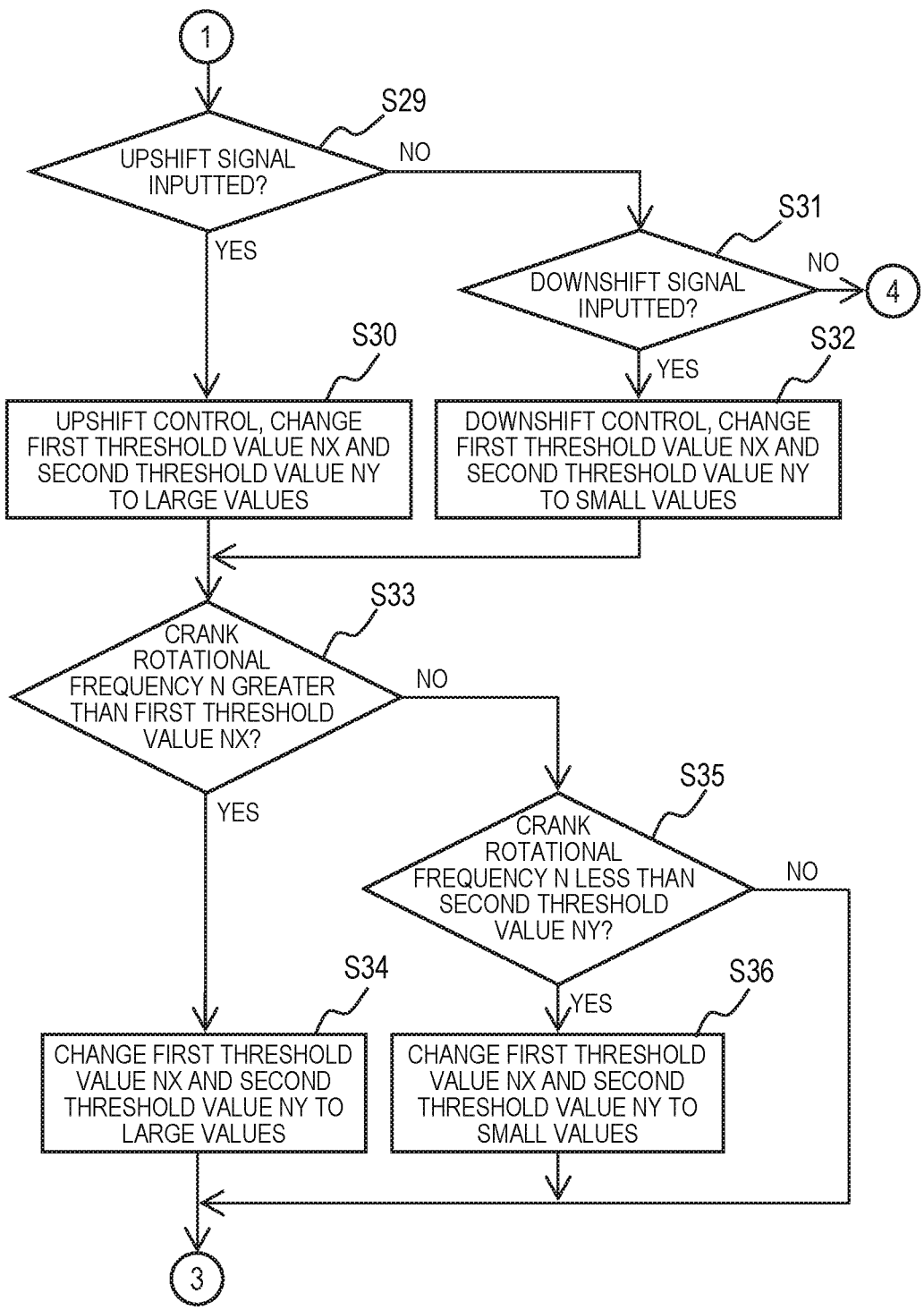
FIG. 6 is a flowchart of a second set of steps of the shifting process executed by the controller of FIG. 3.

The second set of steps of when the operating unit 20 are operated when traveling on a flat road or downhill will be described, with reference to FIG. 6. The controller 54 determines whether or not a upshift signal has been inputted from the operating unit 20 in step S29. For example, if a upshift signal is inputted after a determination is made on whether or not a previous upshift signal was inputted, then a upshift signal is determined to have been inputted.

When a upshift signal has been inputted, the controller 54 performs a upshift control of the transmission 58 in step S30, and changes the first threshold value NX and the second threshold value NY for traveling to values that are larger than the current values. The change amount of the first threshold value NX and the change amount of the second threshold value NY are preferably equal. The change amount of the first threshold value NX and the change amount of the second threshold value NY are, for example, 3 rpm. After the process of step S30, the controller 54 proceeds to step S33. A upshift control is a control to cause the transmission 58 to be operated in the direction in which the gear ratio γ becomes larger.

If a upshift signal has not been inputted in step S29, then the controller 54 determines whether or not a downshift signal has been inputted from the operating unit 20 in step S31. For example, if a downshift signal is inputted after a determination is made on whether or not a previous downshift signal was inputted, then a downshift signal is determined to have been inputted.

When a downshift signal has been inputted, the controller 54 performs a downshift control of the transmission 58 in step S32, and changes the first threshold value NX and the second threshold value NY for traveling to values that are smaller than the current values. The change amount of the first threshold value NX and the change amount of the second threshold value NY are preferably equal. The change amount of the first threshold value NX and the change amount of the second threshold value NY are, for example, 3 rpm. After the process of step S32, the controller 54 proceeds to step S33. A downshift control is a control to cause the transmission 58 to be operated in the direction in which the gear ratio γ becomes smaller.

The controller 54 determines whether or not the crank rotational frequency N is greater than the first threshold value NX in step S33. If the crank rotational frequency N is greater than the first threshold value NX, then the first threshold value NX and the second threshold value NY are changed to larger values than the current values in step S34, and the steps are repeated again from step S22 (refer to FIG. 5). The change amount of the first threshold value NX and the change amount of the second threshold value NY in step S33 are, for example, 3 rpm.

If the crank rotational frequency N is less than or equal to the first threshold value NX, then the controller 54 determines whether or not the crank rotational frequency N is less than the second threshold value NY in step S35. If the crank rotational frequency N is less than the second threshold value NY, then the first threshold value NX and the second threshold value NY are changed to smaller values than the current values in step S36, and the steps are repeated again from step S22 (refer to FIG. 5). The change amount of the first threshold value NX and the change amount of the second threshold value NY in step S35 are, for example, 3 rpm.

If the crank rotational frequency N is greater than or equal to the second threshold value NY in step S35, that is, if the crank rotational frequency N is within a range of less than the first threshold value NX and greater than the second threshold value NY, then the controller 54 does not change the first threshold value NX and the second threshold value NY and repeats the steps from step S22 (refer to FIG. 5) again.

Figure 7:
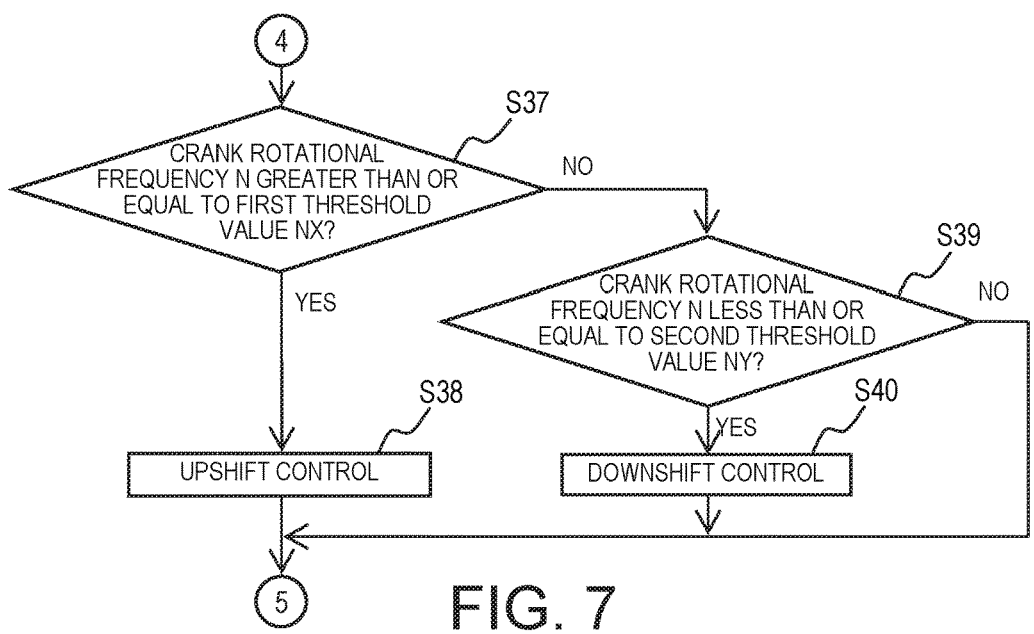
FIG. 7 is a flowchart of a third set of steps of the shifting process executed by the controller of FIG. 3.

If a downshift signal has not been inputted in step S31, that is, if neither a upshift signal nor a downshift signal has been inputted from the operation device 20, then the controller 54 proceeds to step S37 (refer to FIG. 7).

The third set of steps for maintaining the crank rotational frequency N when traveling on a flat road or downhill will be described with reference to FIG. 7. When the zero start flag is set, the first threshold value NX and the second threshold value NY for starting are set as the first threshold value NX and the second threshold value NY. Accordingly, the third set of steps are carried out based on the fifth shifting condition. When the zero start flag is not set, the first threshold value NX and the second threshold value NY for traveling are set as the first threshold value NX and the second threshold value NY. Accordingly, the third set of steps are carried out based on the second shifting condition.

The controller 54 determines whether or not the crank rotational frequency N is greater than or equal to first threshold value NX in step S37. If the crank rotational frequency N is greater than or equal to the first threshold value NX, then the controller 54 executes a upshift control in step S38, proceeds to step S22 (refer to FIG. 1), and executes the steps from step S22 again.

If the crank rotational frequency N is less than the first threshold value NX, then the controller 54 determines whether or not the crank rotational frequency N is less than or equal to the second threshold value NY in step S39. If the crank rotational frequency N is less than or equal to the second threshold value NY, then the controller 54 executes a downshift control in step S40, proceeds to step S22 (refer to FIG. 1), and executes the steps from step S22 again.

If the crank rotational frequency N is greater than the second threshold value NY in step S39, that is, if the crank rotational frequency N is within a range of less than the first threshold value NX and greater than the second threshold value NY, then the controller 54 does not perform a upshift control or a downshift control, proceeds to step S22 (refer to FIG. 1), and repeats the steps from step S22 again.

Figure 8:
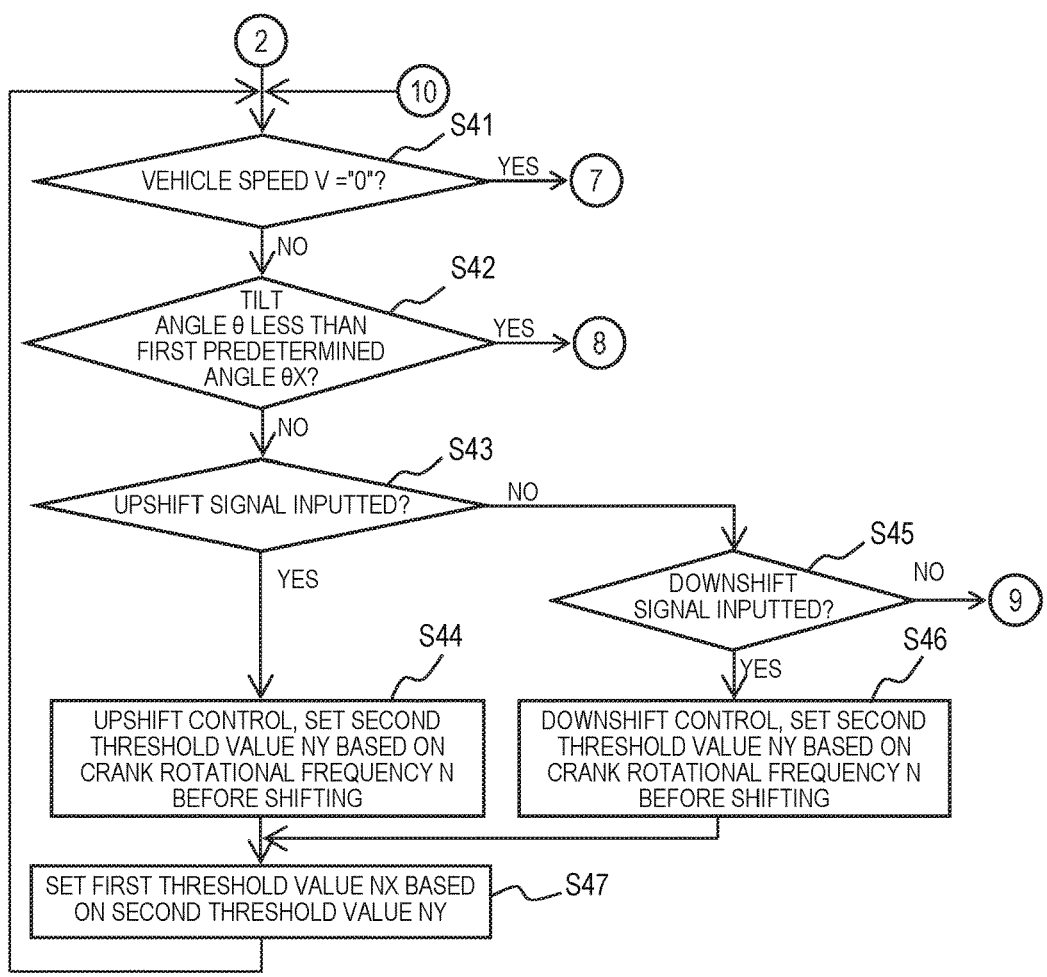
FIG. 8 is a flowchart of a fourth set of steps of the shifting process executed by the controller of FIG. 3.

The fourth steps of when the operating unit 20 is operated when traveling uphill will be described, with reference to FIG. 8. The controller 54 determines whether or not the vehicle speed V is "0" in step S41. When the vehicle speed V is "0," the controller 54 starts the steps from step S21 (refer to FIG. 1) again. When the vehicle speed V is greater than "0," the controller 54 determines whether or not the tilt angle θ is less than the first predetermined angle θX, in step S42. The controller 54 proceeds to step S22 (refer to FIG. 5) when the tilt angle θ is less than the first predetermined angle θX, and proceeds to step S43 when the tilt angle θ is greater than or equal to the first predetermined angle θX.

The controller 54 determines whether or not a upshift signal has been inputted from the operating unit 20 in step S43. For example, if a upshift signal is inputted after a determination is made on whether or not a previous upshift signal was inputted, then a upshift signal is determined to have been inputted.

When a upshift signal has been inputted, the controller 54 performs a upshift control of the transmission 58 in step S44, and changes the second threshold value NY based on the crank rotational frequency N of before executing the upshift control, that is, before shifting. Specifically, the controller 54 changes the rotational frequency obtained by subtracting a first predetermined number from the crank rotational frequency N of before executing a upshift control to the second threshold value NY. The sixth shifting condition is thereby set. The first predetermined number is, for example, 3 rpm. After the process of step S44, the controller 54 sets the first threshold value NX in step S47.

If a upshift signal has not been inputted in step S43, then the controller 54 determines whether or not a downshift signal has been inputted from the operating unit 20 in step S45. For example, if a downshift signal is inputted after a determination is made on whether or not a previous downshift signal was inputted, then a downshift signal is determined to have been inputted.

When a downshift signal has been inputted, the controller 54 performs a downshift control of the transmission 58 in step S46, and changes the second threshold value NY based on the crank rotational frequency N of before executing the downshift control, that is, before shifting. Specifically, the controller 54 changes the crank rotational frequency N of before executing a downshift control to the second threshold value NY. The seventh shifting condition is thereby set. After the process of step S46, the controller 54 sets the first threshold value NX in step S47.

The controller 54 changes the first threshold value NX based on the second threshold value NY in step S47. Specifically, the controller 54 changes the rotational frequency obtained by adding a second predetermined number to the second threshold value NY which is set in step S44 or step S46 to the first threshold value NX. The second predetermined number is, for example, 20 rpm. After changing the first threshold value NX in step S47, the controller 54 proceeds to step S41 and executes the steps from step S41 again.

Figure 9:
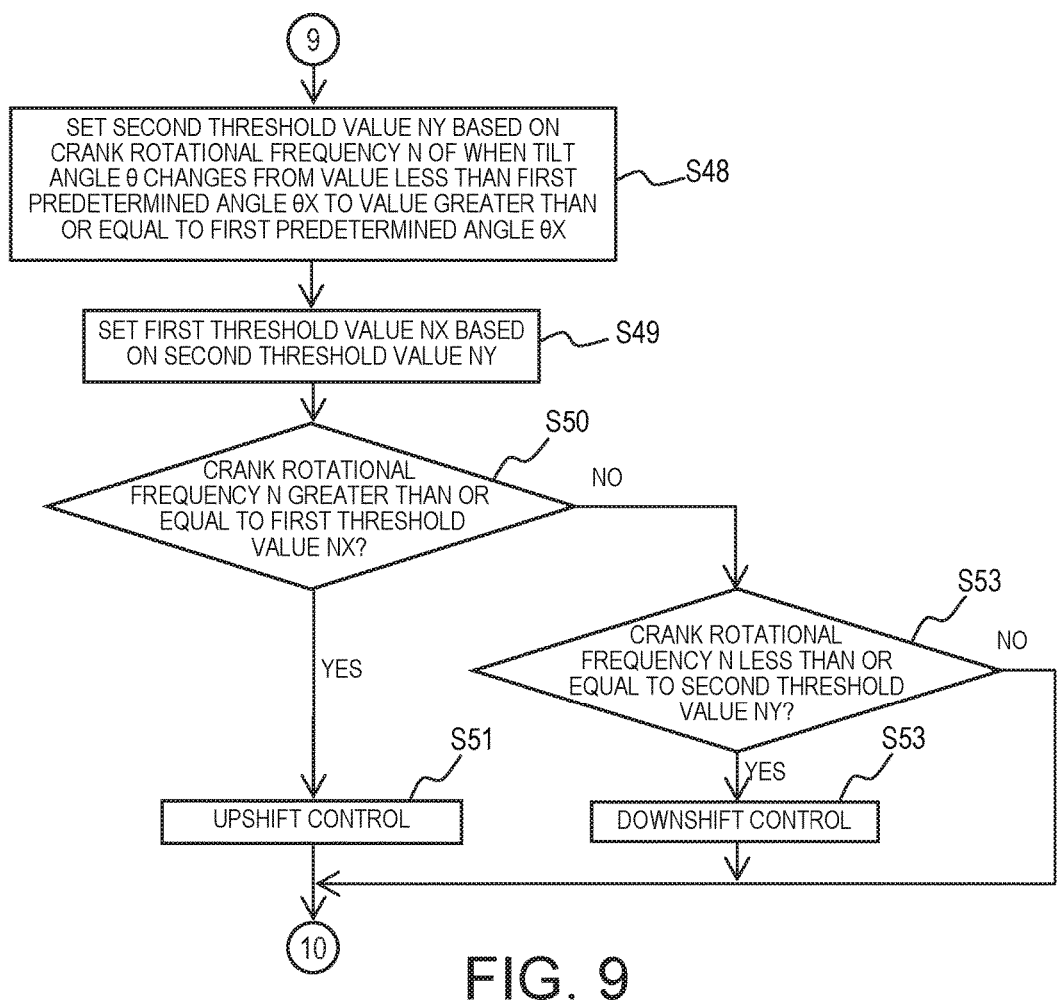
FIG. 9 is a flowchart of a fifth set of steps of the shifting process executed by the controller of FIG. 3.

If a downshift signal has not been inputted in step S45, that is, if neither a upshift signal nor a downshift signal has been inputted from the operation device 20, then the controller 54 proceeds to step S48 (refer to FIG. 9).

The fifth set of steps for maintaining the crank rotational frequency N when mainly traveling uphill will be described with reference to FIG. 9. When neither a upshift signal nor a downshift signal has been inputted after the tilt angle θ changes from a value that is less than the first predetermined angle θX to a value that is greater than or equal to the first predetermined angle θX, the first threshold value NX and the second threshold value NY are changed based on the crank rotational frequency N of when the tilt angle θ changes from a value that is less than the first predetermined angle θX to a value that is greater than or equal to the first predetermined angle θX. Accordingly, the fifth set of steps are carried out based on the first shifting condition.

When a upshift signal has been inputted after the tilt angle θ has changed from a value that is less than the first predetermined angle θX to a value that is greater than or equal to the first predetermined angle θX, and when the last input was not a downshift signal but a upshift signal, the first threshold value NX and the second threshold value NY are changed based on the upshift signal. Accordingly, the fifth set of steps are carried out based on the sixth shifting condition.

When a downshift signal has been inputted after the tilt angle θ has changed from a value that is less than the first predetermined angle θX to a value that is greater than or equal to the first predetermined angle θX, and when the last input was not a upshift signal but a downshift signal, the first threshold value NX and the second threshold value NY are changed based on the downshift signal. Accordingly, the fifth set of steps are carried out based on the seventh shifting condition.

The controller 54 changes the second threshold value NY based on the crank rotational frequency N of when the tilt angle θ changes from a value that is less than a first predetermined angle θX to a value that is greater than or equal to the first predetermined angle θX, in step S48.

Specifically, the controller 54 changes a value obtained by subtracting a third predetermined number from the crank rotational frequency N of when the tilt angle θ has changed from a value that is less than the first predetermined angle θX to a value that is greater than or equal to the first predetermined angle θX to the second threshold value NY. The first shifting condition is thereby set. The third predetermined value is, for example, 3 rpm. Accordingly, the second threshold value NY in the first shifting condition is smaller than the crank rotational frequency N of when the tilt angle θ has become greater than or equal to the first predetermined angle θX.

The controller 54 changes the first threshold value NX based on the second threshold value NY in step S49. Specifically, the controller 54 changes the rotational frequency obtained by adding a fourth predetermined number to the second threshold value NY which is set in step S48 to the first threshold value NX. The first shifting condition is thereby set. The fourth predetermined number is, for example, 20 rpm. Accordingly, the first threshold value NX in the first shifting condition is larger than the crank rotational frequency N of when the tilt angle θ has changed from a value that is less than the first predetermined angle θX to a value that is greater than or equal to the first predetermined angle θX. Further, the difference between the second threshold value NY in the first shifting condition and the crank rotational frequency N of when the tilt angle θ changes from a value that is less than the first predetermined angle θX to a value that is greater than or equal to the first predetermined angle θX, is smaller than the difference between the first threshold value NX in the first shifting condition and the crank rotational frequency N of when the tilt angle θ changes from a value that is less than the first predetermined angle θX to a value that is greater than or equal to the first predetermined angle θX.

Next, the controller 54 determines whether or not the crank rotational frequency N is greater than or equal to first threshold value NX in step S50. If the crank rotational frequency N is greater than or equal to the first threshold value NX, then the controller 54 executes a upshift control in step S51, proceeds to step S41 (refer to FIG. 8), and executes the steps from step S41 again. That is, if the crank rotational frequency N exceeds the first threshold value NX, then the controller 54 controls the transmission 58 so that the gear ratio γ is increased.

If the crank rotational frequency N is less than the first threshold value NX, then the controller 54 determines whether or not the crank rotational frequency N is less than or equal to the second threshold value NY in step S52. If the crank rotational frequency N is less than or equal to the second threshold value NY, then the controller 54 executes a downshift control in step S53, proceeds to step S41 (refer to FIG. 8), and executes the steps from step S41 again. That is, if the crank rotational frequency N becomes less than or equal to the second threshold value NY, then the controller 54 controls the transmission 58 so that the gear ratio γ is decreased.

As described above, the controller 54 causes the transmission 58 to be operated when the crank rotational frequency N becomes greater than or equal to the first threshold value NX or less than or equal to the second threshold value NY. If the crank rotational frequency N is greater than the second threshold value NY in step S52, that is, if the crank rotational frequency N is within a range of less than the first threshold value NX and greater than the second threshold value NY, then the controller 54 does not perform a upshift control or a downshift control, proceeds to step S41 (refer to FIG. 8), and repeats the steps from step S41 again.

The action and effects of the controller 54 will be described.

(1) The controller 54 sets a predetermined shifting condition based on the crank rotational frequency N and the tilt angle θ. Accordingly, a shift control corresponding to the traveling environment of the bicycle 10 can be carried out.

(2) The controller 54 sets a first shifting condition by changing the first threshold value NX and the second threshold value NY based on the crank rotational frequency N of when the tilt angle θ changes from a value that is less than a first predetermined angle θX to a value that is greater than or equal to the first predetermined angle θX. The crank rotational frequency N of when the tilt angle θ changes from a value that is less than a first predetermined angle θX to a value that is greater than or equal to the first predetermined angle θX falls within the range between the first threshold value NX and the second threshold value NY after change. Accordingly, when the tilt angle θ changes from a value that is less than the first predetermined angle θX to a value that is greater than or equal to the first predetermined angle θX, the controller 54 controls the transmission 58 to be maintained in the vicinity of the crank rotational frequency N of before becoming greater than or equal to the first predetermined angle θX. Accordingly, when the tilt angle θ changes from a value that is less than the first predetermined angle θX to a value that is greater than or equal to the first predetermined angle θX, the crank rotational frequency N becomes less likely to change; therefore, an increase in the manual drive force can be suppressed.

(3) The difference between the second threshold value NY in the first shifting condition and the crank rotational frequency N of when the tilt angle θ changes from a value that is less than the first predetermined angle θX to a value that is greater than or equal to the first predetermined angle θX, is smaller than the difference between the first threshold value NX in the first shifting condition and the crank rotational frequency N of when the tilt angle θ changes from a value that is less than the first predetermined angle θX to a value that is greater than or equal to the first predetermined angle θX. That is, a change in the gear ratio γ is easier to carry out when the crank rotational frequency N is descending than when ascending. Accordingly, the transmission 58 is easily operated in a direction in which the gear ratio γ is decreased, if the crank rotational frequency N is reduced when the tilt angle θ is greater than or equal to the first predetermined angle θX. Accordingly, a state in which the load of the driver is large being continued can be suppressed by the gear ratio γ being reduced, when the crank rotational frequency N is decreased caused by the load of the driver being large during uphill traveling.

(4) The controller 54 causes the transmission 58 to be operated based on the crank rotational frequency N and the second shifting condition when the tilt angle θ exceeds 0 degrees and is less than the first predetermined angle θX. Accordingly, the crank rotational frequency N of when the tilt angle θ exceeds 0 degrees and is less than the first predetermined angle θX is maintained in a predetermined range from the first threshold value NX to the second threshold value NY for traveling.

(5) In a situation in which the acceleration GA is increased, such as when climbing over level differences on the road surface, there is the risk that the crank rotational frequency N is changed. The controller 54 prohibits a control of the transmission 58 corresponding to the crank rotational frequency N and a predetermined shifting condition, until a predetermined period TA has elapsed after the acceleration GA exceeds a predetermined acceleration GX. Accordingly, the transmission 58 being operated due to fluctuation in the crank rotational frequency N caused by climbing over level differences or the like can be suppressed.

(6) The acceleration GA is increased when the level difference of the road surface is large. Further, the fluctuation time of the crank rotational frequency N caused by climbing over level differences and the like tends to become long. Since the predetermined period TA is set based on the magnitude of the acceleration GA, the transmission 58 being operated due to changes in the output of the tilt sensor 60 caused by climbing over level differences or the like can be further suppressed.

(7) In a virtual transmission control apparatus in which the second threshold value NY for starting and the second threshold value NY for traveling are the same, a situation in which the crank rotational frequency N becomes lower than the second threshold value NY is easily created at the time of starting traveling of the bicycle 10; therefore, there is the risk that the controller 54 excessively executes a upshift control.

When the bicycle 10 starts to travel from a stopped state, the controller 54 causes the transmission 58 to be operated based on the crank rotational frequency N and the fifth shifting condition until the gear ratio γ becomes greater than or equal to a predetermined gear ratio γA. The lower limit threshold NY1 corresponding to the first gear ratio γA in the fifth shifting condition is smaller than the lower limit threshold NY2 corresponding to the second gear ratio γB. Accordingly, excessive execution of a upshift control at the time of starting running of the bicycle 10 can be suppressed.

Further, in a virtual transmission control apparatus in which the second threshold value NY for starting is smaller than the second threshold value NY for traveling, and the first threshold value NX for starting and the first threshold value NX for traveling are the same, a situation in which the crank rotational frequency N becomes lower than the first threshold value NX is easily created at the time of starting traveling of the bicycle 10; therefore, it is difficult for the controller 54 to carry out a upshift control. Consequently, due to a state in which the gear ratio γ is small being continued, there can be the risk that a state is created in which the travel resistance of the road surface is excessively low with respect to the torque that can be transmitted from the rear wheel 14 to the road surface at the time of starting traveling.

The upper limit threshold NX1 corresponding to the first gear ratio γA in the fifth shifting condition is smaller than the upper limit threshold NX2 corresponding to the second gear ratio γB. Accordingly, torque from the front wheel 12 and the rear wheel 14 can be appropriately transmitted to the road surface.

(8) It is conceivable that the crank rotational frequency N is reduced when carrying out a upshift control. When a upshift signal is inputted from the operating unit 20, the controller 54 sets a sixth shifting condition by changing a value that is smaller than the crank rotational frequency N of immediately after causing the transmission 58 to be operated to the second threshold value NY. Accordingly, it is possible to suppress a downshift control being executed due to the crank rotational frequency N becoming lower than the second threshold value NY after carrying out a upshift control based on a upshift signal.

(9) It is conceivable that the crank rotational frequency N is increased when carrying out a downshift control. When a downshift signal is inputted from the operating unit 20, the controller 54 sets a seventh shifting condition by changing the crank rotational frequency N of before causing the transmission 58 to be operated to the second threshold value NY, and changing the first threshold value NX to a value that is larger than the second threshold value NY. Accordingly, it is possible to suppress a upshift control being executed due to the crank rotational frequency N exceeding the first threshold value NX after carrying out a downshift control based on a downshift signal.

Second Embodiment

The controller 54 of the second embodiment sets a predetermined shifting condition based on the crank rotational frequency N and the tilt angle θ. The predetermined shifting conditions include a first shifting condition, a second shifting condition, a third shifting condition, and a fourth shifting condition. The predetermined shifting conditions include a threshold value related to the crank rotational frequency N. The controller 54 causes the transmission 58 to be operated according to a comparison result between the crank rotational frequency N and the threshold value. The controller 54 sets the predetermined shifting condition by changing the threshold value. The threshold value includes a first threshold value NX and a second threshold value NY.

The controller 54 sets a first shifting condition by changing at least the second threshold value NY, based on the tilt angle θ being greater than or equal to the first predetermined angle θX, and on the fact that the tilt angle θ has changed. Specifically, the controller 54 sets a first shifting condition by increasing at least the second threshold value NY, based on the rate of change being greater than or equal to a first ratio when the tilt angle θ has changed in an increasing direction. Further, the controller 54 sets a first shifting condition by increasing at least the second threshold value NY, based on the amount of change being greater than or equal to a first change amount when the tilt angle θ has changed in an increasing direction.

The controller 54 sets a first shifting condition by decreasing at least the second threshold value NY, based on the rate of change being greater than or equal to a second ratio when the tilt angle θ has changed in a decreasing direction. Alternatively, the controller 54 sets a first shifting condition by decreasing at least the second threshold value NY, based on the amount of change being greater than or equal to a second change amount when the tilt angle θ has changed in a decreasing direction.

When the tilt angle θ is greater than or equal to the first predetermined angle θX, the controller 54 sets the first shifting condition based on the increased travel distance of the bicycle 10 being greater than or equal to a first travel distance, or, the elapsed travel time of the bicycle 10 being greater than or equal to a first travel time.

The controller 54 causes the transmission 58 to be operated based on the parameter representing the running state of the bicycle 10 and the third shifting condition, when the tilt angle θ is less than or equal to the second predetermined angle θY which is less than 0 degrees. The parameter representing the running state of the bicycle 10 is, for example, the crank rotational frequency N.

The controller 54 sets a third shifting condition by changing at least the first threshold value NX, based on the tilt angle θ being less than or equal to the second predetermined angle θY, and on the fact that the tilt angle θ has changed. Specifically, the controller 54 sets a third shifting condition by decreasing at least the first threshold value NX, based on the rate of change being greater than or equal to a third ratio when the tilt angle θ has changed in a decreasing direction. Alternatively, the controller 54 sets a third shifting condition by decreasing at least the first threshold value NX, based on the amount of change being greater than or equal to a third change amount when the tilt angle θ has changed in a decreasing direction.

The controller 54 sets a third shifting condition by increasing at least the first threshold value NX, based on the rate of change being greater than or equal to a fourth ratio when the tilt angle θ has changed in an increasing direction. Further, the controller 54 sets a third shifting condition by increasing at least the first threshold value NX, based on the amount of change being greater than or equal to a fourth change amount when the tilt angle θ has changed in an increasing direction.

When the tilt angle θ is less than or equal to the second predetermined angle θY, the controller 54 sets the third shifting condition based on the increased travel distance of the bicycle 10 being greater than or equal to a second travel distance, or, the elapsed travel time of the bicycle 10 being greater than or equal to a second travel time.

The controller 54 sets the third shifting condition based on the crank rotational frequency N, which is one example of a parameter representing the running state of the bicycle 10, of when the tilt angle θ changes from a value that exceeds a second predetermined angle θY to a value that is less than or equal to the second predetermined angle θY.

The first threshold value NX in the third shifting condition is smaller than the crank rotational frequency N of the bicycle 10 when the tilt angle θ changes from a value that exceeds the second predetermined angle θY to a value that is less than or equal to the second predetermined angle θY. The second threshold value NY in the third shifting condition is smaller than the crank rotational frequency N of the bicycle 10 when the tilt angle θ changes from a value that exceeds the second predetermined angle θY to a value that is less than or equal to the second predetermined angle θY.

In the third shifting condition, the difference between the second threshold value NY and the crank rotational frequency N of when the tilt angle θ changes from a value that exceeds the second predetermined angle θY to a value that is less than or equal to the second predetermined angle θY, is larger than the difference between the first threshold value NX and the crank rotational frequency N of when the tilt angle θ changes from a value that exceeds the second predetermined angle θY to a value that is less than or equal to the second predetermined angle θY.

The controller 54 causes the transmission 58 to be operated based on the crank rotational frequency N of the bicycle 10 and the fourth shifting condition, when the tilt angle θ is less than 0 degrees and exceeds to the second predetermined angle θY. The shifting processes that are executed by the controller 54 are described with reference to FIG. 10-FIG. 12. The shifting process includes a sixth set of steps, a seventh set of steps, and an eighth set of steps.

Figure 10:
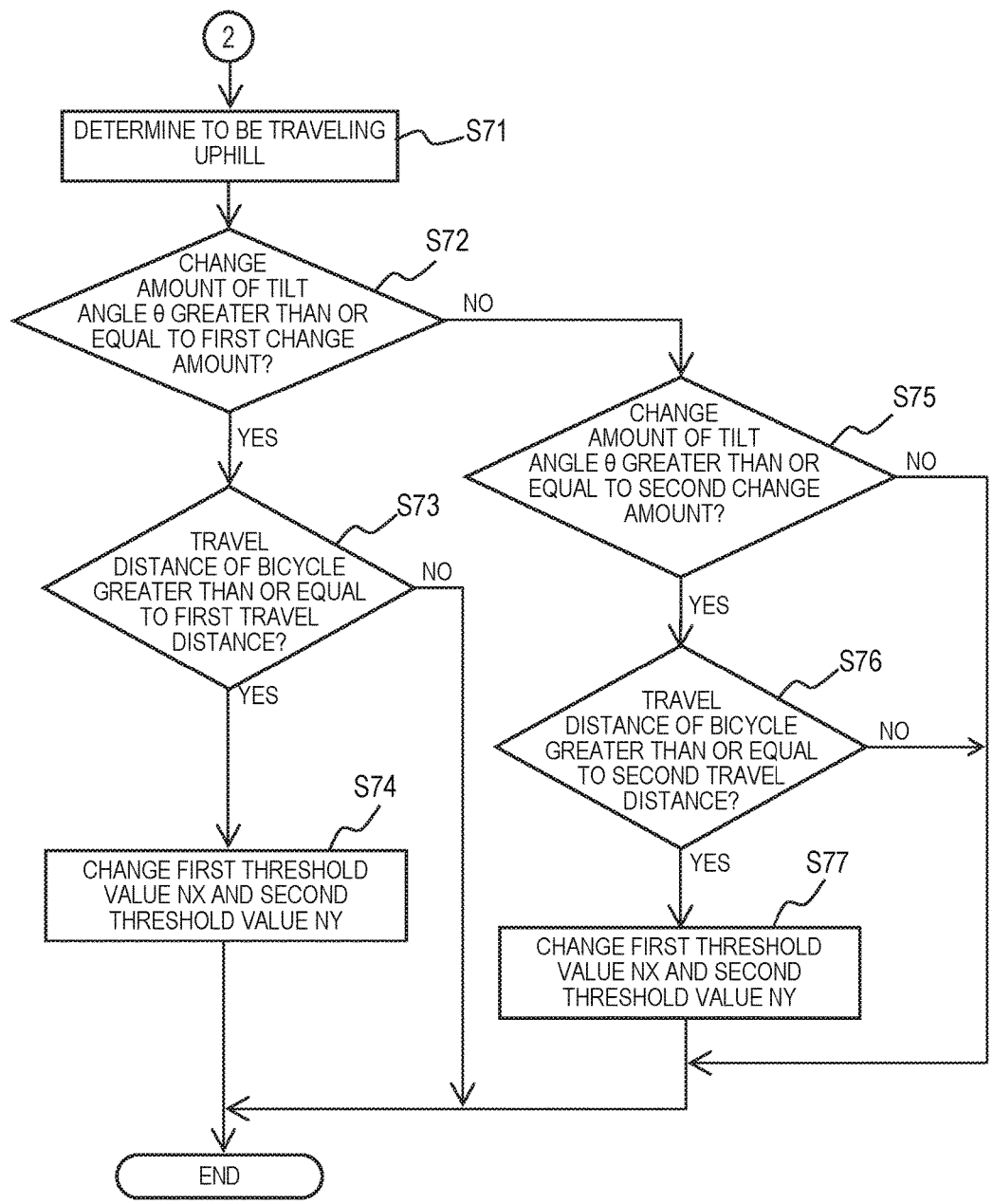
FIG. 10 is a flowchart of a sixth set of steps of the shifting process executed by the controller in accordance with a second embodiment.

The sixth set of steps for maintaining the crank rotational frequency N, when the tilt angle θ is changed while mainly traveling uphill, will be described with reference to FIG. 10. When the tilt angle θ is determined to be greater than or equal to the first predetermined angle θX in step S28 in FIG. 5, the controller 54 determines that the bicycle 10 is traveling uphill in step S71, and proceeds to step S72. The process of step S71 can be omitted.

After setting at least one of the latest first threshold value NX and the latest second threshold value NY based on an output of the tilt sensor 60 and the vehicle speed sensor 78 in step S72, the controller 54 determines whether or not the amount of change of the tilt angle θ in the increasing direction has become greater than or equal to a first change amount. The first change amount is, for example, an angle that corresponds to an uphill road gradient of 1%.

If determined YES in step S72, then the controller 54 determines whether or not the travel distance of the bicycle 10 that is increased after setting at least one of the latest first threshold value NX and the latest second threshold value NY is greater than or equal to a first travel distance, in step S73. The first travel distance is, for example, 5 m.

If determined YES in step S73, then the controller 54 changes the first threshold value NX and the second threshold value NY in step S74, and ends the sixth set of steps. The controller 54 sets the rotational frequency obtained by subtracting a predetermined rotational frequency from the current crank rotational frequency N as the second threshold value NY in the first shifting condition. The predetermined rotational frequency to be subtracted is, for example, 3 rpm. The controller 54 sets the rotational frequency obtained by adding a predetermined rotational frequency to the changed second threshold value NY as the first threshold value NX in the first shifting condition. The predetermined rotational frequency to be added is, for example, 20 rpm. If determined NO in step S73, then the controller 54 ends the sixth set of steps.

If determined NO in step S72, after setting at least one of the latest first threshold value NX and the latest second threshold value NY in step S75, then the controller 54 determines whether or not the amount of change of the tilt angle θ in the decreasing direction has become greater than or equal to a second change amount. The second change amount is, for example, an angle that corresponds to a downhill road gradient of 2%. If the change amount of the tilt angle θ in the decreasing direction is determined to be less than the second change amount, then the controller 54 ends the sixth set of steps.

If the change amount of the tilt angle θ in the decreasing direction is determined to be greater than or equal to the second change amount, then the controller 54 determines whether or not the travel distance of the bicycle 10 that is increased after setting at least one of the latest first threshold value NX and the latest second threshold value NY is greater than or equal to the first travel distance, in step S76. If the increased travel distance of the bicycle 10 is determined to be less than the first travel distance, then the controller 54 ends the sixth set of steps.

If the increased travel distance of the bicycle 10 is determined to be greater than or equal to the first travel distance, then the controller 54 changes the first threshold value NX and the second threshold value NY in step S77 and ends the sixth set of steps. The controller 54 changes the first threshold value NX and the second threshold value NY in the first shifting condition to the first threshold value NX and the second threshold value NY for traveling. When the sixth set of steps are ended, the controller 54 proceeds to the process of step S22.

Figure 11:
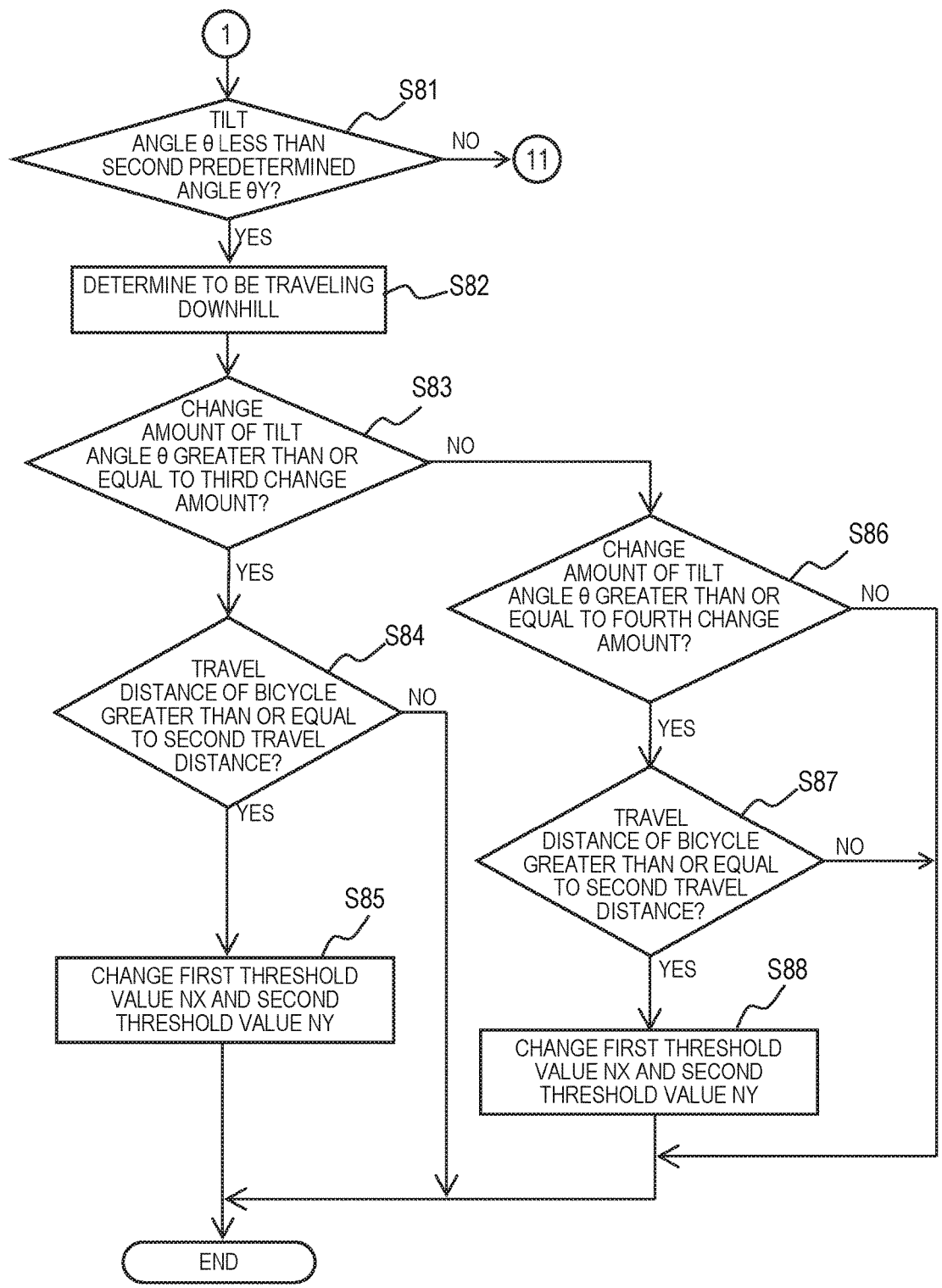
FIG. 11 is a flowchart of a seventh set of steps of the shifting process executed by the controller of the second embodiment.

The seventh set of steps for maintaining the crank rotational frequency N, when the tilt angle θ is changed while mainly traveling downhill, will be described with reference to FIG. 11. When the tilt angle θ is determined to be less than the first predetermined angle θX in step S28 in FIG. 5, the controller 54 determines whether or not the tilt angle θ is less than or equal to a second predetermined angle θY based on the outputs of the tilt sensor 60 and the vehicle speed sensor 78, in step S81. The second predetermined angle θY is preferably selected to be an angle that corresponds to a downhill road gradient of 2%-10%. The second predetermined angle θY is, for example, 1.1 degrees, corresponding to a downhill road gradient of 2%.

If determined YES in step S81, then the controller 54 determines that the bicycle 10 is traveling downhill in step S82, and proceeds to step S83. The process of step S82 can be omitted.

The controller 54 determines whether or not the change amount of the tilt angle θ in the decreasing direction is greater than or equal to a third change amount, based on the outputs of the tilt sensor 60 and the vehicle speed sensor 78, in step S83. The third change amount is, for example, an angle that corresponds to a downhill road gradient of 1%.

If determined YES in step S83, then the controller 54 determines whether or not the travel distance of the bicycle 10 that is increased after setting the latest first threshold value NX and the latest second threshold value NY is greater than or equal to a second travel distance, in step S84. The second travel distance is, for example, 5 m.

If determined YES in step S84, then the controller 54 changes the first threshold value NX and the second threshold value NY in step S85, and ends the seventh set of steps. The controller 54 sets the rotational frequency obtained by subtracting a predetermined rotational frequency from the current crank rotational frequency N as the second threshold value NY in the third shifting condition. The predetermined rotational frequency to be subtracted is, for example, 3 rpm. The controller 54 sets the rotational frequency obtained by adding a predetermined rotational frequency to the changed second threshold value NY as the first threshold value NX in the third shifting condition. The predetermined rotational frequency to be added is, for example, 20 rpm. If determined NO in step S84, then the controller 54 ends the seventh set of steps.

If determined NO in step S84, then the controller 54 determines whether or not the change amount of the tilt angle θ in the increasing direction is greater than or equal to a fourth change amount, in step S86. The fourth change amount is, for example, an angle that corresponds to an uphill road gradient of 2%. If determined NO in step S86, then the controller 54 ends the seventh set of steps.

If determined YES in step S86, then the controller 54 determines whether or not the travel distance of the bicycle 10 that is increased after setting the latest first threshold value NX and the latest second threshold value NY is greater than or equal to a second travel distance, in step S87. The second travel distance is, for example, 5 m. If the increased travel distance of the bicycle 10 is less than the second travel distance, then the controller 54 ends the seventh set of steps.

If determined YES in step S87, then the controller 54 changes the first threshold value NX and the second threshold value NY in step S88, and ends the seventh set of steps. The controller 54 changes the first threshold value NX and the second threshold value NY in the third shifting condition to the first threshold value NX and the second threshold value NY for traveling. When the seventh set of steps are ended, the controller 54 proceeds to the process of step S22.

Figure 12:
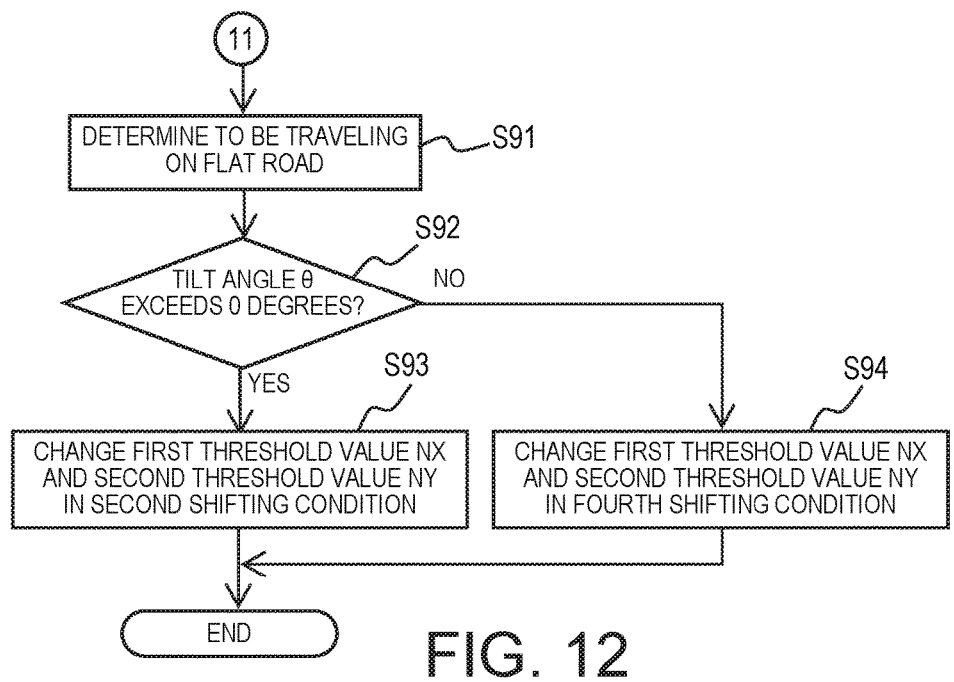
FIG. 12 is a flowchart of an eighth set of steps of the shifting process executed by the controller of the second embodiment.

The eighth set of steps for maintaining the crank rotational frequency N when traveling on a flat road will be described with reference to FIG. 12. If determined NO in step S81 in FIG. 11, then the controller 54 determines that the bicycle 10 is traveling a flat road, due to the tilt angle θ being an angle that is less than the first predetermined angle θX and exceeding the second predetermined angle θY, in step S91. The process of step S81 can be omitted.

The controller 54 determines whether or not the tilt angle θ exceeds 0 degrees based on the outputs of the tilt sensor 60 and the vehicle speed sensor 78, in step S92. When the tilt angle θ exceeds 0 degrees, the controller 54 changes the first threshold value NX and the second threshold value NY in the second shifting condition to the first threshold value NX and the second threshold value NY for traveling in step S93, and ends the eighth set of steps.

When the tilt angle θ is less than or equal to 0 degrees, the controller 54 of the second embodiment changes the first threshold value NX and the second threshold value NY in the fourth shifting condition to the first threshold value NX and the second threshold value NY for traveling in step S94, and ends the eighth set of steps. When the eighth set of steps are ended, the controller 54 proceeds to the process of step S22.

In addition to the effects of (1)-(9) above, the controller 54 further exerts the following effects.

(10) The controller 54 sets a first shifting condition by changing at least the second threshold value NY, based on the tilt angle θ being greater than or equal to the first predetermined angle θX, and on the fact that the tilt angle θ has changed. Accordingly, even if the tilt angle θ is changed while the bicycle 10 is traveling uphill, the crank rotational frequency N is less likely to greatly change from the crank rotational frequency N of when the tilt angle θ changes from a value that is less than a first predetermined angle θX to a value that is greater than or equal to the first predetermined angle θX.

(11) The controller 54 sets a first shifting condition by increasing at least the second threshold value NY, based on the amount of change being greater than or equal to a first change amount when the tilt angle θ has changed in an increasing direction. Accordingly, a downshift control is easily executed when the tilt angle θ is increased and the crank rotational frequency N is decreased while the bicycle 10 is traveling uphill. Accordingly, a state in which the load of the rider is large being maintained can be suppressed.

(12) The controller 54 sets a first shifting condition by decreasing at least the second threshold value NY, based on the amount of change being greater than or equal to a second change amount when the tilt angle θ has changed in a decreasing direction. Accordingly, even if the tilt angle θ changes in a decreasing direction while the bicycle 10 is traveling uphill, a downshift control is less easily executed; therefore, the crank rotational frequency N being excessively increased can be suppressed.

(13) When the tilt angle θ is greater than or equal to the first predetermined angle θX, the controller 54 sets the first shifting condition based on the increased travel distance of the bicycle 10 being greater than or equal to a first travel distance. Accordingly, the first shifting condition being frequently changed can be suppressed.

(14) The controller 54 causes the transmission 58 to be operated based on the crank rotational frequency N of the bicycle 10 and the third shifting condition, when the tilt angle θ is less than or equal to the second predetermined angle θY, which is less than 0 degrees. The crank rotational frequency N of when the tilt angle θ has become less than or equal to the second predetermined angle θY falls within the range between the first threshold value NX and the second threshold value NY after change. Accordingly, when the tilt angle θ has become less than or equal to the second predetermined angle θY, the controller 54 controls the transmission 58 to be maintained in the vicinity of the crank rotational frequency N of before becoming less than or equal to the second predetermined angle θY. Accordingly, when the tilt angle θ changes from a value that exceeds the second predetermined angle θY to a value that is less than or equal to the second predetermined angle θY, the crank rotational frequency N becomes less likely to change; therefore, a decrease in the manual drive force can be suppressed.

(15) The controller 54 sets a third shifting condition by changing at least the first threshold value NX, based on the tilt angle θ being less than or equal to the second predetermined angle θY, and on the fact that the tilt angle θ has changed. Accordingly, even if the tilt angle θ is changed while the bicycle 10 is traveling downhill, the crank rotational frequency N is less likely to greatly change from the crank rotational frequency N of when the tilt angle θ changes from a value that exceeds the second predetermined angle θY to a value that is less than or equal to the second predetermined angle θY.

(16) The controller 54 sets a third shifting condition by decreasing at least the first threshold value NX, based on the amount of change being greater than or equal to a third change amount when the tilt angle θ has changed in a decreasing direction. Accordingly, a upshift control is easily executed when the tilt angle θ is decreased and the crank rotational frequency N is increased while the bicycle 10 is traveling downhill. Accordingly, the crank rotational frequency N is less likely to be excessively increased.

(17) The controller 54 sets a third shifting condition by increasing at least the first threshold value NX, based on the amount of change being greater than or equal to a fourth change amount when the tilt angle θ has changed in an increasing direction. Accordingly, when the tilt angle θ changes in the increasing direction while the bicycle 10 is traveling downhill, a upshift control is less easily executed; therefore, the load of the rider is less likely to be increased.

(18) When the tilt angle θ is less than or equal to the second predetermined angle θY, the controller 54 sets the third shifting condition based on the increased travel distance of the bicycle 10 being greater than or equal to a second travel distance. Accordingly, the third shifting condition being frequently changed can be suppressed.

(19) In the third shifting condition, the difference between the second threshold value NY and the crank rotational frequency N of when the tilt angle θ changes from a value that exceeds the second predetermined angle θY to a value that is less than or equal to the second predetermined angle θY, is larger than the difference between the first threshold value NX and the crank rotational frequency N of when the tilt angle θ changes from a value that exceeds the second predetermined angle θY to a value that is less than or equal to the second predetermined angle θY. Accordingly, a change in the gear ratio γ is easier to carry out when the crank rotational frequency N is descending than when ascending. Accordingly, the transmission 58 is easily operated in a direction in which the gear ratio γ is increased, if the crank rotational frequency N is increased when the tilt angle θ is less than or equal to the second predetermined angle θY. Accordingly, the crank rotational frequency N is less likely to be excessively increased while traveling downhill.

Modified Examples

The specific form that the present transmission control apparatus can take is not limited to the forms illustrated in the above-described embodiments. The present transmission control apparatus can take various forms different from the above-described embodiments. The modified example of the above-described embodiments shown below is one example of the various forms that the present transmission control apparatus can take.

Figure 13:
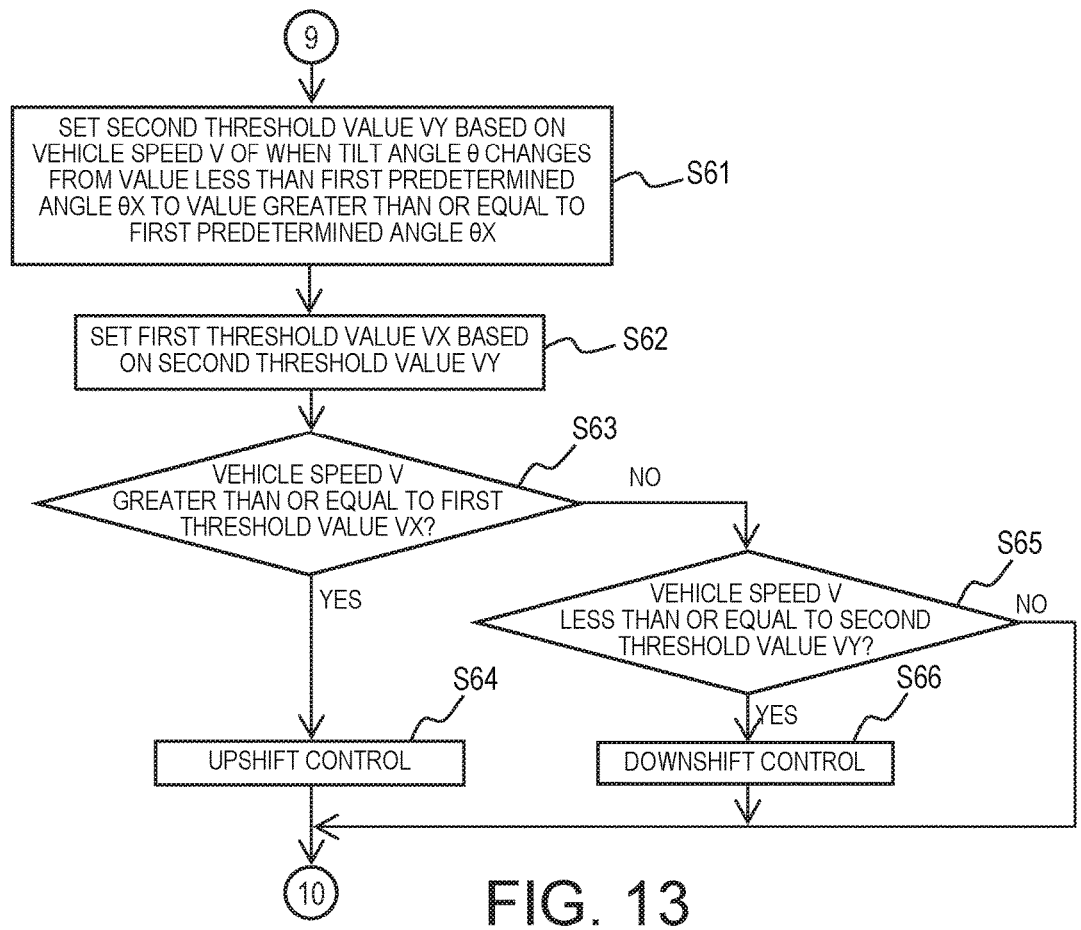
FIG. 13 is a flowchart of a modified example of the fifth set of steps of the shifting process of the first embodiment.

The vehicle speed V can be used instead of the crank rotational frequency N, as the parameter representing the running state of the bicycle 10. In this case, the storage unit 82 stores the first threshold value VX and the second threshold value VY for traveling, as well as, the first threshold value VX and the second threshold value VY for starting, related to the vehicle speed V. A set of steps that uses the vehicle speed V will be described using a modified example of the fifth set of steps shown in FIG. 13.

The controller 54 changes the second threshold value VY based on the vehicle speed V of when the tilt angle θ changes from a value that is less than a first predetermined angle θX to a value that is greater than or equal to the first predetermined angle θX, in step S61. Specifically, the controller 54 changes a value obtained by subtracting a first predetermined vehicle speed from the vehicle speed V of when the tilt angle θ has become greater than or equal to the first predetermined angle θX to the second threshold value VY. The controller 54 changes the first threshold value VX based on the second threshold value VY in step S62. Specifically, the controller 54 changes the rotational frequency obtained by adding a second predetermined vehicle speed to the second threshold value VY which is set in step S61 to the first threshold value VX.

Next, the controller 54 determines whether or not the vehicle speed V is greater than or equal to the first threshold value VX in step S63. When the vehicle speed V is greater than or equal to the first threshold value VX, the controller 54 carries out a upshift control in step S64. That is, if the vehicle speed V exceeds the first threshold value VX, which is the first threshold value, then the controller 54 controls the transmission 58 so that the gear ratio γ is increased. If the vehicle speed V is less than the first threshold value VX, then the controller 54 determines whether or not the vehicle speed V is less than the second threshold value VY in step S65. When the vehicle speed V is less than the second threshold value VY, the controller 54 carries out a downshift control in step S66. That is, if the vehicle speed V becomes less than the second threshold value VY, which is the second threshold value, then the controller 54 controls the transmission 58 so that the gear ratio γ is decreased. On the other hand, if the vehicle speed V is greater than or equal to the second threshold value VY in step S65, that is, if the vehicle speed V is within a range of less than the first threshold value VX and greater than the second threshold value VY, then the controller 54 does not perform a upshift control or a downshift control.

Figure 14:
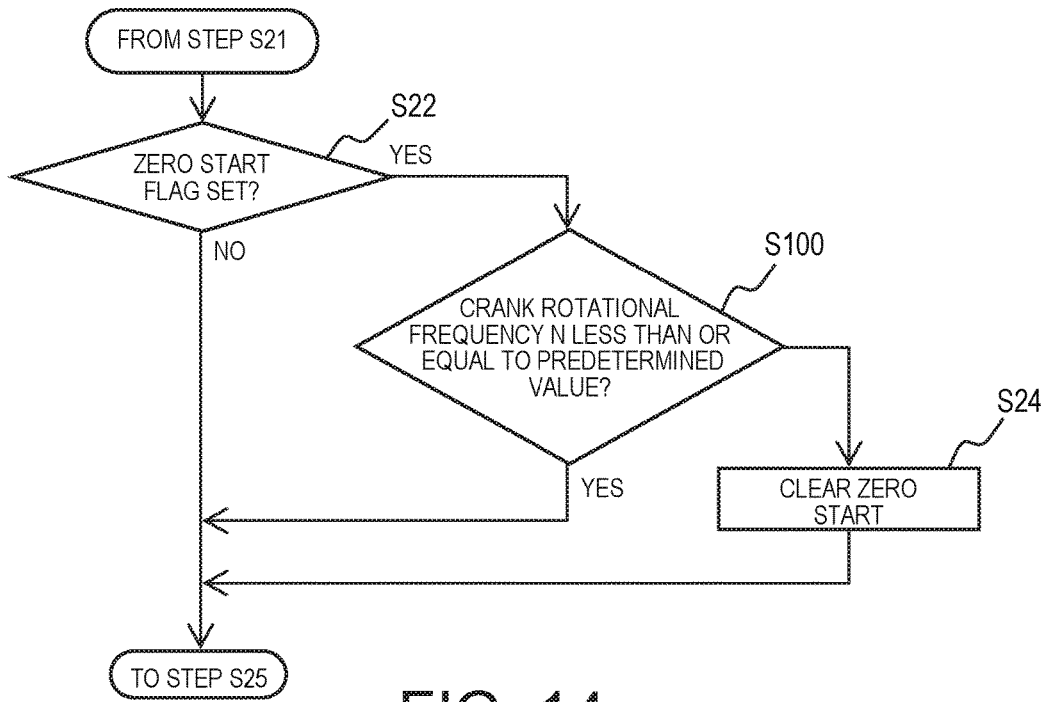
FIG. 14 is a flowchart of a modified example of the first set of steps of the shifting process of the first embodiment.

The transmission 58 can be caused to operate based on the crank rotational frequency N and the fifth shifting condition until the crank rotational frequency N reaches a predetermined value. Specifically, the process of step S100 in FIG. 14 is executed instead of step S23 of the first set of steps in FIG. 5. When a zero start flag is determined to be set in step S22, the controller 54 does not clear the zero start flag when the crank rotational frequency N is less than or equal to a predetermined value in step S100, and proceeds to step S25. On the other hand, if the crank rotational frequency N is greater than the predetermined value, then the controller 54 clears the zero start flag in step S24 and proceeds to step S25. That is, when the bicycle 10 starts to travel from a stopped state, the controller 54 causes the transmission 58 to be operated based on the crank rotational frequency N and the fifth shifting condition until the crank rotational frequency N reaches a predetermined value.

A vehicle speed detection device 56 can be provided to the transmission 58 as well. In this case, for example, the magnet 76 is provided to one the pair of pulleys 64A, and the vehicle speed sensor 78 is provided to the chain guide 65 or the coupling member 66. The vehicle speed sensor 78 outputs a signal corresponding to the rotational speed of the pulley 64A, which reflects the vehicle speed V. The controller 54 calculates the vehicle speed V based on the output of the vehicle speed sensor 78, the circumferential length of the pulley 64A, and the gear ratio γ. The pulley 64A can be configured as a dynamo, and the rotation pulse of the dynamo, which is a signal that reflects the vehicle speed V, can be outputted to the controller 54 as well. In this case, by not providing a one-way clutch between the rear sprocket 40 and the chain 42 but rather providing a one-way clutch between the crankshaft 44 and the front sprocket 48, the pulley 64A can be rotated even when the bicycle 10 is traveling and the rotation of the crankshaft 44 is stopped. Accordingly, the vehicle speed V can be detected by the vehicle speed detection device 56, even when the rotation of the crankshaft 44 is stopped.

The vehicle speed detection device 56 can also be configured as a GPS (Global Positioning System) receiver. In this case, the vehicle speed V is calculated based on positional information and travel time.

The vehicle speed detection device 56 can be configured by a crank rotation detection device 84. In this case, the vehicle speed V is calculated based on the crank rotational frequency N, the gear ratio γ, and the circumferential length of the rear wheel 14.

The acceleration sensor 74 can be omitted from the tilt sensor 60 as well.

The tilt sensor 60 can be provided to bicycle components such as the front derailleur, the rear derailleur, or an operating device.

The transmission 58 can be a front derailleur as well. The front derailleur is attached to the frame 24, preferably to the seat tube 24C, in the vicinity of the crankshaft 44. The front derailleur switches the chain 42 between a plurality of front sprockets by a drive of an actuator (not shown) provided to the front derailleur, to change the gear ratio γ of the bicycle 10.

The transmission 58 can comprise a front derailleur and a rear derailleur. In the case that the front derailleur and the rear derailleur are controlled automatically, the controller 54 controls at least one of the front derailleur and the rear derailleur to perform shifting according to a gear ratio γ order that is set in advance.

The controller 54 can be provided to the vehicle body 16, such as the frame 24, the handlebar 26, or the stem 26A.

The transmission 58 can be changed to an internal type transmission 58. For example, a transmission that is attached around an axle 14A of the rear wheel 14 and built into the hub shell can be employed. In this case, the transmission can be changed to an internal transmission 58 that is provided around the crankshaft 44.

Figure 15:
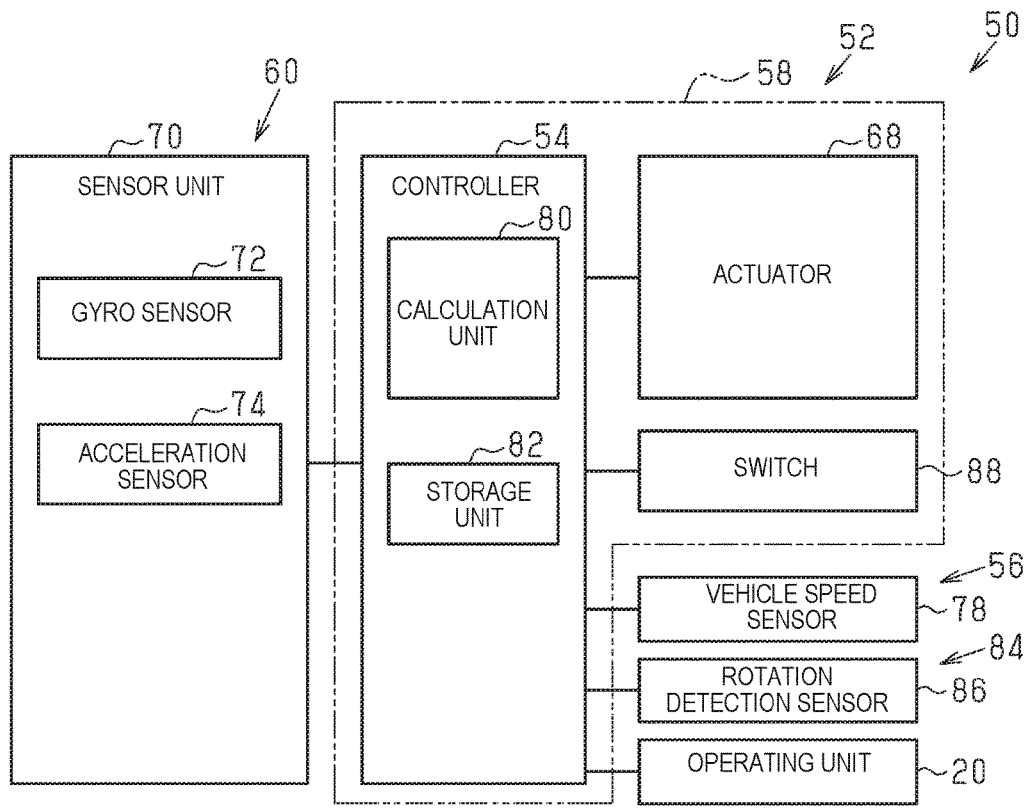
FIG. 15 is a block diagram of a transmission control apparatus of a modified example of the first embodiment.

As shown in FIG. 15, a switch 88 for setting the initial value of the tilt angle θ can be provided to the transmission device 52 as well. In this case, the operator places the bicycle 10 in a flat location in a stopped state and presses the switch 88. The controller 54 stores the tilt angle θ of when the switch 88 is pressed as the initial value to the storage unit 82. The controller 54 calculates the tilt angle θ based on the stored initial value in step S15, which are the calculation steps for the tilt angle θ. The initial value of the tilt angle θ can be set using a computer that can be connected to the controller 54 by wire or wireless, instead of the switch 88.

The road gradient can be used instead of the tilt angle θ in step S28 and step S42. In this case, the controller 54 calculates the road gradient from the tilt angle θ. The controller 54 sets a first shifting condition when the road gradient is greater than or equal to a predetermined gradient, and sets a second shifting condition when the road gradient is less than the predetermined gradient.

The tilt angle θ can be calculated as a roll angle, or as a value including the roll angle and the pitch angle of the bicycle 10.

A display device can be mounted on the bicycle 10 to display the tilt angle θ, or the road gradient that is calculated based on the tilt angle θ.

The controller 54 can also be configured to change at least the second threshold value NY in step S74 and step S77 of the sixth set of steps. The controller 54 can also be configured to change at least the first threshold value NX in step S85 and step S88 of the seventh set of steps.

In step S72, the controller 54 can set a first shifting condition by changing at least the second threshold value NY, based on the rate of change being greater than or equal to a first ratio when the tilt angle θ has changed in an increasing direction.

In step S75, the controller 54 can set a first shifting condition by changing at least the second threshold value NY, based on the rate of change being greater than or equal to a second ratio when the tilt angle θ has changed in a decreasing direction.

In at least one of step S73 and step S76, the controller 54 can also set the first shifting condition based on the elapsed travel time of the bicycle being greater than or equal to a first travel time.

In the sixth set of steps, the controller 54 can also omit at least one of step S73 and step S76. In the same way, in the seventh set of steps, the controller 54 can also omit at least one of step S84 and step S87.

In step S74, the controller 54 can also maintain the first threshold value NX in the first shifting condition. In the same way, in step S76, the controller 54 can also maintain the first threshold value NX in the first shifting condition.

In step S83, the controller 54 can set a third shifting condition by changing at least the first threshold value NX, based on the rate of change being greater than or equal to a third ratio when the tilt angle θ has changed in a decreasing direction. The controller 54 of this modified example can change at least the first threshold value NX every time the rate of change of the tilt angle θ becomes greater than or equal to the third ratio.

In step S86, the controller 54 can set a third shifting condition by changing at least the first threshold value NX, based on the rate of change being greater than or equal to a fourth ratio when the tilt angle θ has changed in an increasing direction. The controller 54 of this modified example can change at least the first threshold value NX every time the rate of change of the tilt angle θ becomes greater than or equal to the fourth ratio.

In at least one of step S84 and step S87, the controller 54 can also set the third shifting condition based on the elapsed travel time of the bicycle being greater than or equal to a second travel time.

At least one of the parameters of the first change amount, the second change amount, the third change amount, the fourth change amount, the first travel distance, the second travel distance, the first ratio, the second ratio, the third ratio, the fourth ratio, the first travel time, and the second travel time, can be configured to be changeable by an external device or a cycle computer that is connected to the transmission control apparatus 50 by wire or wirelessly.

The controller 54 can also control the transmission control apparatus 50 by combining the second set of steps, the fourth set of steps, the sixth set of steps, and the seventh set of steps. In this case, for example, the controller 54 proceeds to step S71 in FIG. 10 when determined NO in step S31 in FIG. 6, and proceeds to step S81 in FIG. 11 when determined NO in step S45 in FIG. 8.

In step S85, the controller 54 can also maintain the second threshold value NY in the third shifting condition. In the same way, in step S88, the controller 54 can also maintain the second threshold value NY in the third shifting condition.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle transmission control apparatus comprising:
   a controller configured to operate a transmission to be operated according to a parameter representing a running state of a bicycle and a predetermined shifting condition,
   the controller being further configured to set the predetermined shifting condition based on the parameter representing the running state of the bicycle and a tilt angle of the bicycle, the predetermined shifting condition including a threshold value related to the parameter representing the running state of the bicycle, and
   the controller being further configured to set the predetermined shifting condition by changing the threshold value, the controller changing the threshold value based on changes of the bicycle running state when the tilt angle changes from a predetermined angle.

2. The bicycle transmission control apparatus as recited in claim 1, wherein
   the parameter representing the running state of the bicycle is at least one from among a rotational frequency a bicycle crank of the bicycle and a traveling speed of the bicycle.

3. The bicycle transmission control apparatus as recited in claim 2, wherein
   the controller is configured to calculate the rotational frequency of the crank based on an output of a sensor that detects the rotational frequency of the bicycle crank.

4. The bicycle transmission control apparatus as recited in claim 2, wherein
   the controller is configured to calculate the rotational frequency of the crank based on an output of a sensor that detects the vehicle speed of the bicycle.

5. The bicycle transmission control apparatus as recited in claim 1, wherein
   the controller is configured to calculate the tilt angle based on an output of a tilt sensor that detects the tilt angle of the bicycle.

6. The bicycle transmission control apparatus as recited in claim 1, wherein
   the tilt angle of the bicycle is a tilt angle in a longitudinal direction of the bicycle.

7. The bicycle transmission control apparatus as recited in claim 6, wherein
   the tilt angle of the bicycle is a pitch angle of the bicycle.

8. A bicycle transmission control apparatus comprising:
   a controller configured to operate a transmission to be operated according to a parameter representing a running state of a bicycle and a predetermined shifting condition,
   the controller being further configured to set the predetermined shifting condition based on the parameter representing the running state of the bicycle and a tilt angle of the bicycle,
   the predetermined shifting condition including a threshold value related to the parameter representing the running state of the bicycle, and
   the controller being configured to set the predetermined shifting condition by changing the threshold value, the threshold value including a first threshold value, and a second threshold value that is smaller than the first threshold value, and the controller being further configured to operate the transmission of a parameter representing the running state of the bicycle changes from being less than the first threshold value to be greater than or equal to the first threshold value, or, when the parameter representing the running state of the bicycle changes from exceeding the second threshold value to being less than or equal to the second threshold value.

9. The bicycle transmission control apparatus as recited in claim 8, wherein
the controller is configured to control the transmission so that the gear ratio of the bicycle is increased when the parameter representing the running state of the bicycle changes from being less than the first threshold value to be i-s greater than or equal to the first threshold value, and control the transmission so that the gear ratio of the bicycle is decreased when the value of the parameter representing the running state of the bicycle changes from exceeding the second threshold value to be less than or equal to the second threshold value.

10. The bicycle transmission control apparatus as recited in claim 8, wherein
the predetermined shifting condition includes a first shifting condition,
the controller is configured to operate the transmission based on the parameter that represents the running state of the bicycle and the first shifting condition when the tilt angle is greater than or equal to a first predetermined angle that exceeds zero degrees,
the controller is further configured to set the first shifting condition by changing at least the second threshold value, based on the tilt angle being greater than or equal to the first predetermined angle, and on a fact that the tilt angle has changed.

11. The bicycle transmission control apparatus as recited in claim 10, wherein
the controller is configured to set the first shifting condition by increasing at least the second threshold value, based on a rate of change being greater than or equal to a first ratio when the tilt angle has changed in an increasing direction, or, an amount of change being greater than or equal to a first change amount when the tilt angle has changed in an increasing direction.

12. The bicycle transmission control apparatus as recited in claim 10, wherein
the controller is configured to set the first shifting condition by decreasing at least the second threshold value, based on a rate of change being greater than or equal to a second ratio when the tilt angle has changed in a decreasing direction, or, an amount of change being greater than or equal to a second change amount when the tilt angle has changed in a decreasing direction.

13. A bicycle transmission control apparatus comprising:
a controller configured to operate a transmission to be operated according to a parameter representing a running state of a bicycle and a predetermined shifting condition,
the controller being further configured to set the predetermined shifting condition based on the parameter representing the running state of the bicycle and a tilt angle of the bicycle, the predetermined shifting condition including a first shifting condition, and
the controller being further configured to operate the transmission based on the parameter that represents the running state of the bicycle and the first shifting condition when the tilt angle is greater than or equal to a first predetermined angle that exceeds zero degrees.

14. The bicycle transmission control apparatus as recited in claim 13, wherein
the controller is configured to set the first shifting condition when the tilt angle is greater than or equal to the first predetermined angle, based on an increased travel distance of the bicycle being greater than or equal to a first travel distance, or, an elapsed travel time of the bicycle being greater than or equal to a first travel time.

15. The bicycle transmission control apparatus as recited in claim 13, wherein
the controller is configured to set the first shifting condition, based on a parameter representing the running state of the bicycle when the tilt angle changes from being less than the first predetermined angle to be greater than or equal to the first predetermined angle.

16. The bicycle transmission control apparatus as recited in claim 15, wherein
the threshold value includes a first threshold value, and a second threshold value that is smaller than the first threshold value,
the controller is configured to operate the transmission when a parameter representing the running state of the bicycle changes from being less than the first threshold value to be greater than or equal to the first threshold value, or, when the parameter representing the running state of the bicycle changes from a value exceeding the second threshold value to be less than or equal to the second threshold value,
the first threshold value in the first shifting condition is greater than the parameter representing the running state of the bicycle of when the tilt angle changes from being less than the first predetermined angle to be greater than or equal to the first predetermined angle, and
the second threshold value in the first shifting condition is greater than the parameter representing the running state of the bicycle of when the tilt angle changes from being less than the first predetermined angle to be greater than or equal to the first predetermined angle.

17. The bicycle transmission control apparatus as recited in claim 16, wherein
a difference between the parameter representing the running state of the bicycle of when the tilt angle changes from being less than the first predetermined angle to be greater than or equal to the first predetermined angle, and
the second threshold value in the first shifting condition, is smaller than the difference between the parameter representing the running state of the bicycle of when the tilt angle changes from being less than the first predetermined angle to be greater than or equal to the first predetermined angle, and
the first threshold value in the first shifting condition.

18. The bicycle transmission control apparatus as recited in claim 13, wherein
the predetermined shifting conditions include a second shifting condition, and
the controller is configured to operate the transmission based on the parameter that represents the running state of the bicycle and the second shifting condition when the tilt angle exceeds 0 degrees and is less than the first predetermined angle.

19. A bicycle transmission control apparatus comprising:
a controller configured to operate a transmission to be operated according to a parameter representing a running state of a bicycle and a predetermined shifting condition, the controller being further configured to set the predetermined shifting condition based on the parameter representing the running state of the bicycle and a tilt angle of the bicycle, the predetermined shifting condition including a threshold value related to the parameter representing the running state of the bicycle, the predetermined shifting condition including a third shifting condition, and the controller being further configured to set the predetermined shifting condition by changing the threshold value, and configured to operate the transmission based on the parameter that represents the running state of the bicycle and the third shifting condition when the tilt angle is less than or equal to a second predetermined angle that is less than zero degrees.

20. The bicycle transmission control apparatus as recited in claim 19, wherein the threshold value includes a first threshold value, and a second threshold value that is smaller than the first threshold value, the controller is configured to operate the transmission when a parameter representing the running state of the bicycle changes from being less than the first threshold value to be greater than or equal to the first threshold value, or, when the parameter representing the running state of the bicycle changes from a exceeding the second threshold value to be less than or equal to the second threshold value, and the controller is configured to set the third shifting condition by changing at least the first threshold value, based on the tilt angle being less than or equal to the second predetermined angle, and on the fact that the tilt angle has changed.

21. The bicycle transmission control apparatus as recited in claim 20, wherein the controller is configured to set the third shifting condition by decreasing at least the first threshold value, based on the rate of change being greater than or equal to a third ratio when the tilt angle has changed in a decreasing direction, or, the amount of change being greater than or equal to a third change amount when the tilt angle has changed in a decreasing direction.

22. The bicycle transmission control apparatus as recited in claim 20, wherein the controller is configured to set the third shifting condition by increasing at least the first threshold value, based on the rate of change being greater than or equal to a fourth ratio when the tilt angle has changed in an increasing direction, or, the amount of change being greater than or equal to a fourth change amount when the tilt angle has changed in an increasing direction.

23. The bicycle transmission control apparatus as recited in claim 19, wherein the controller is configured to set the third shifting condition when the tilt angle is less than or equal to the second predetermined angle, based on the increased travel distance of the bicycle being greater than or equal to a second travel distance, or, the elapsed travel time of the bicycle being greater than or equal to a second travel time.

24. The bicycle transmission control apparatus as recited in claim 19, wherein the controller is configured to set the third shifting condition, based on a parameter representing the running state of the bicycle when the tilt angle changes from exceeding the second predetermined angle to being less than or equal to the second predetermined angle.

25. The bicycle transmission control apparatus as recited in claim 24, wherein the threshold value includes a first threshold value, and a second threshold value that is smaller than the first threshold value, the controller is configured to operate the transmission when a parameter representing the running state of the bicycle changes from being less than the first threshold value to be greater than or equal to the first threshold value, or, when the parameter representing the running state of the bicycle changes from exceeding the second threshold value to be less than or equal to the second threshold value, the first threshold value in the third shifting condition is smaller than the parameter representing the running state of the bicycle of when the tilt angle changes from exceeding the second predetermined angle to be less than or equal to the second predetermined angle, and the second threshold value in the third shifting condition is smaller than the parameter representing the running state of the bicycle of when the tilt angle changes from exceeding the second predetermined angle to be less than or equal to the second predetermined angle.

26. The bicycle transmission control apparatus as recited in claim 25, wherein a difference between the parameter representing the running state of the bicycle of when the tilt angle changes from exceeding the second predetermined angle to be less than or equal to the second predetermined angle, and the second threshold value in the third shifting condition, is larger than the difference between the parameter representing the running state of the bicycle of when the tilt angle changes from exceeding the second predetermined angle to be less than or equal to the second predetermined angle, and the first threshold value in the third shifting condition.

27. The bicycle transmission control apparatus as recited in claim 19, wherein the predetermined shifting conditions include a fourth shifting condition, and the controller is configured to operate the transmission based on the parameter that represents the running state of the bicycle and the fourth shifting condition when the tilt angle is less than 0 degrees and exceeds the second predetermined angle.

28. A bicycle transmission control apparatus comprising:

a controller configured to operate a transmission to be operated according to a parameter representing a running state of a bicycle and a predetermined shifting condition, the controller being further configured to set the predetermined shifting condition based on the parameter representing the running state of the bicycle and a tilt angle of the bicycle, the predetermined shifting conditions including a fifth shifting condition, and the controller being further configured to operate the transmission based on the parameter that represents the running state of the bicycle and the fifth shifting condition until the value of the parameter representing the running state of the bicycle reaches a predetermined value, when starting from a state in which the bicycle is stopped.

29. The bicycle transmission control apparatus as recited in claim 28, wherein the predetermined shifting condition includes a threshold value related to the parameter representing the running state of the bicycle, the controller is configured to set the predetermined shifting condition by changing the threshold value, the threshold value in the fifth shifting condition includes a third threshold value and a fourth threshold value, the third threshold value corresponds to a first gear ratio, and the fourth gear ratio is larger than the third threshold value, and corresponds to a second gear ratio that is larger than the first gear ratio.

30. A bicycle transmission control apparatus comprising:

a controller configured to operate a transmission to be operated according to a parameter representing a running state of a bicycle and a predetermined shifting condition, the controller being further configured to set the predetermined shifting condition based on the parameter representing the running state of the bicycle and a tilt angle of the bicycle, the predetermined shifting conditions including a sixth shifting condition, and the controller being further configured to operate the transmission when a signal for increasing the gear ratio of the bicycle is inputted from the operating unit, sets the sixth shifting condition based on the parameter representing the running state of the bicycle of immediately after the transmission is operated, and operate the transmission based on the parameter representing the running state of the bicycle and the sixth shifting condition.

31. A bicycle transmission control apparatus comprising:

a controller configured to operate a transmission to be operated according to a parameter representing a running state of a bicycle and a predetermined shifting condition, the controller being further configured to set the predetermined shifting condition based on the parameter representing the running state of the bicycle and a tilt angle of the bicycle, the predetermined shifting conditions including a seventh shifting condition, and the controller being further configured to operate the transmission when a signal for decreasing the gear ratio of the bicycle is inputted from the operating unit, set the seventh shifting condition based on the parameter representing the running state of the bicycle of prior to operating the transmission, and operate the transmission based on the parameter representing the running state of the bicycle and the seventh shifting condition.

32. A bicycle transmission control apparatus comprising:

a controller configured to operate a transmission to be operated according to a parameter representing a running state of a bicycle and a predetermined shifting condition, the controller being further configured to set the predetermined shifting condition based on the parameter representing the running state of the bicycle and a tilt angle of the bicycle, the controller being further configured to prohibit a control of the transmission according to the parameter representing the running state of the bicycle and the predetermined shifting condition until a predetermined period has elapsed after an acceleration that is generated in the bicycle exceeds a predetermined acceleration.

33. The bicycle transmission control apparatus as recited in claim 32, wherein the predetermined period is set based on the magnitude of the acceleration.

34. A bicycle transmission control apparatus comprising:

a controller configured to operate a transmission to be operated according to a parameter representing a running state of a bicycle and a predetermined shifting condition, the controller being further configured to set the predetermined shifting condition based on the parameter representing the running state of the bicycle and a tilt angle of the bicycle, the predetermined shifting condition including a threshold value related to the parameter representing the running state of the bicycle, the controller being configured to set the predetermined shifting condition by changing the threshold value, the controller being further configured to change the threshold value based on one or more of a first condition and a second condition, the first condition being a rate of change of the tilt angle and the second condition being an amount of change of the tilt angle.

* * * * *